US007991661B1

(12) United States Patent
Gaffney et al.

(10) Patent No.: US 7,991,661 B1
(45) Date of Patent: Aug. 2, 2011

(54) METHOD AND SYSTEM FOR PROVIDING MARKET ANALYSIS FOR WIRELESS VOICE MARKETS

(75) Inventors: Tamara Gaffney, Belmont, CA (US); Stuart Kim-Brown, Oakland, CA (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 292 days.

(21) Appl. No.: 11/732,758

(22) Filed: Apr. 3, 2007

Related U.S. Application Data

(60) Provisional application No. 60/788,901, filed on Apr. 3, 2006.

(51) Int. Cl.
*G07F 19/00* (2006.01)
*H04M 15/00* (2006.01)
*G05B 19/418* (2006.01)
*G06F 9/46* (2006.01)
*G07G 1/00* (2006.01)

(52) U.S. Cl. .................. 705/34; 705/8; 705/10
(58) Field of Classification Search ............ 705/34, 705/8, 10
See application file for complete search history.

(56) References Cited

U.S. PATENT DOCUMENTS

| | | | | |
|---|---|---|---|---|
| 6,650,887 | B2 * | 11/2003 | McGregor et al. | 455/406 |
| 6,766,946 | B2 * | 7/2004 | Iida et al. | 235/381 |
| 7,440,871 | B2 * | 10/2008 | McConnell et al. | 702/188 |
| 2002/0198830 | A1 * | 12/2002 | Randell et al. | 705/40 |
| 2003/0065553 | A1 * | 4/2003 | Couchot et al. | 705/10 |
| 2004/0034578 | A1 * | 2/2004 | Oney et al. | 705/28 |
| 2004/0148257 | A1 * | 7/2004 | Garcia | 705/40 |
| 2004/0181493 | A1 * | 9/2004 | Cross et al. | 705/75 |
| 2005/0040951 | A1 * | 2/2005 | Zalewski et al. | 340/572.1 |
| 2005/0108775 | A1 * | 5/2005 | Bachar et al. | 725/135 |
| 2005/0175181 | A1 * | 8/2005 | Bergs et al. | 380/270 |
| 2006/0031082 | A1 * | 2/2006 | Amaitis et al. | 705/1 |
| 2006/0168613 | A1 * | 7/2006 | Wood et al. | 725/11 |
| 2007/0060306 | A1 * | 3/2007 | Amaitis et al. | 463/25 |
| 2007/0107008 | A1 * | 5/2007 | Dybus | 725/9 |
| 2007/0140318 | A1 * | 6/2007 | Hellman | 375/130 |
| 2008/0275774 | A1 * | 11/2008 | Pepe et al. | 705/14 |

OTHER PUBLICATIONS

Under a watchful eye by Storey, Charlene KOmar, Credit union Management, vol. 23 No. 11, pp. 44-47+ Nov. 2000.*
Storey, Charlene Komar, Under a watchful eye, Credit Union Management, vol. 23 No. 11 pp. 44-47.*
Tim Kridel, Strength in Numbers, Wireless Review, Aug 1, 1999, vol. 16, Iss 15, pp. 39—2 pages.*
FCC sets wireless E-911 Requirements for Handsets Wireless Today, Potomac, May 13, 1999, vol. 3, Issue 92, p. 1.*

(Continued)

*Primary Examiner* — Matthew Gart
*Assistant Examiner* — Harshad Parikh
(74) *Attorney, Agent, or Firm* — Hanley, Flight & Zimmerman, LLC.

(57) ABSTRACT

A computer-implemented method and computer system for providing market analysis for a wireless voice market. Embodiments provide convenient and effective mechanisms for obtaining wireless voice information from online bills of a panel of wireless subscribers, thereby reducing subscriber interaction and enabling more complete and frequent access to the wireless voice information used to provide market analysis. The wireless voice information is scraped from the online bill (e.g., after obtaining permission from a wireless subscriber) and stored in a database for subsequent access, processing and output (e.g., in the form of a presentation, datafeed, as part of an online tool used by a client to access the information, etc.). The processing may include standardizing, cleaning, classifying and applying additional information (e.g., census data comprising demographic information, user-supplied information, etc.) to the voice information to provide further and/or more relevant market analysis.

14 Claims, 24 Drawing Sheets

OTHER PUBLICATIONS

Office Action issued for U.S. Appl. No. 11/732,613, issued Nov. 14, 2008, 44 pages.
Office Action issued for U.S. Appl. No. 11/732,613, issued Apr. 22, 2009, 69 pages.
United States Patent and Trademark Office, Office Action issued for U.S. Appl. No. 11/732,613, issued on Apr. 22, 2009, 69 pages.
United States Patent and Trademark Office, office action issued for U.S. Appl. No. 11/732,613, dated Nov. 29, 2010, 86 pages.

* cited by examiner

METHOD AND SYSTEM FOR PROVIDING MARKET ANALYSIS FOR WIRELESS VOICE MARKETS

RELATED APPLICATIONS

The present application is related to and claims the benefit of U.S. Provisional Patent Application No. 60/788,901, filed Apr. 3, 2006, entitled "METRICS FOR MOBILE DEVICE MARKET," naming Tamara Gaffney, Brian Thomas Monighetti, and Stuart David Kim-Brown as inventors, assigned to the assignee of the present invention. That application is incorporated herein by reference in its entirety and for all purposes.

The present application is related to U.S. patent application Ser. No. 11/732,613 filed Apr. 3, 2007, entitled "METHOD AND SYSTEM FOR PROVIDING MARKET ANALYSIS FOR WIRELESS DATA MARKETS," naming Tamara Gaffney and Stuart Kim-Brown as inventors, assigned to the assignee of the present invention. That application is incorporated herein by reference in its entirety and for all purposes.

BACKGROUND OF THE INVENTION

Most businesses realize that accurate, relevant and representative market analysis is key to increasing revenue. Market analysis can provide information about a business' customers as well as its own business model. Additionally, a business may use market analysis to learn more about customers and business models of its competitors. As such, market analysis can enable businesses to make more intelligent advertising, marketing, design and other important business decisions.

Although accurate, relevant and representative market analysis is desirable, it is not yet available for the wireless voice industry. Conventional methods of collecting wireless voice information (e.g., voice usage, voice charges, voice plan information, etc.) include performing phone surveys and manual collection and scraping of paper bills, which both present accuracy, standardization, and scaling issues. For example, phone surveys require calling individual subscribers and asking for voice information from a recent wireless bill. This method creates accuracy issues given the reliance on the subscriber to view and convey the information. Also, phone surveys are inconvenient and time consuming for both the surveyor and subscriber being surveyed, thereby limiting the amount of information that can be obtained at any time. Additionally, given the inconvenience to the subscriber and the time and cost expended to conduct the surveys, it is hard to obtain scalable information (e.g., from a large number of survey participants) necessary to produce relevant and representative market analysis. Thus, conventional methods fail to accumulate accurate, relevant and representative wireless voice information for market analysis.

Another conventional method used to obtain voice information involves collecting wireless bills in hard-copy form, and manually reviewing and scraping the information from the paper bills. The accuracy and effectiveness of this method is also questionable provided participants may not mail their complete bill for review. Additionally, the time spent reviewing the information on the paper bills prevents the accumulation of sufficient information to provide relevant and representative market information. Thus, conventional methods fail to accumulate accurate, relevant and representative wireless voice information for market analysis.

SUMMARY OF THE INVENTION

Accordingly, a need exists to provide accurate market analysis for the wireless voice market. A need also exists to provide relevant market analysis for the wireless voice market. Representative market analysis for the wireless voice market is also needed. Embodiments of the present invention provide novel solutions to these needs and others as described below.

Embodiments of the present invention are directed to a computer-implemented method and computer system for providing market analysis for a wireless voice market. More specifically, embodiments provide convenient and effective mechanisms for collecting, processing and classifying wireless voice information, which may then be output to provide market analysis for wireless voice markets. The wireless voice information may be obtained from online bills of a panel of wireless subscribers who are randomly selected and adjusted through a process of weighting and balancing to match the general population or any category of types of subscribers (e.g. subscribers on certain types of plans or with interesting behavioral characteristics such as heavy voice callers), thereby reducing subscriber interaction and enabling more complete and frequent access to the wireless voice information used to provide market analysis.

The wireless voice information may then be scraped from the online bill (e.g., after obtaining permission from a wireless subscriber). Scraping may involve an automated process obtaining access and retrieving information (e.g., text, pictures, etc.) from the online bill according to a pre-determined list of desired information. The scraped information may then be stored in a database for subsequent access, processing and output (e.g., in the form of a presentation, datafeed, as part of an online tool used by a client to access the information, etc.).

Once the wireless voice information is obtained, it may be standardized (e.g., normalizing the names of data downloads across all carriers, etc.), cleaned (e.g., removing unnecessary characters, correcting spelling errors, standardizing abbreviations, etc.) and/or appended with additional information (e.g., demographic information, subscriber-supplied information, database fusion such as matching zip codes to other known information about geographic areas, etc.) to provide further and/or more relevant market analysis. The data may be classified in one or more passes to further refine the market analysis, where classification may be by voice type (e.g., international call charges, unlimited use voice packages, calls to directory assistance, etc.) or by another characteristic of the data (e.g., by plan package name, etc.).

The panel of wireless subscribers may be grouped based upon one or more characteristics (e.g., demographics, wireless subscriber characteristics, carrier characteristics, etc.), where each grouping is assigned a weighting factor such that the panel more accurately represents a larger population (e.g., that of the United States, etc.). As such, embodiments enable efficient and accurate collection of wireless voice information, thereby enabling the assembly and maintenance of a scalable panel of wireless subscribers to provide market analysis that is accurate, relevant and representative.

In one embodiment, a computer-implemented method of providing market analysis for a wireless voice market includes determining a panel of wireless subscribers. Wireless voice information is collected from a plurality of online bills of the panel of wireless subscribers (e.g. using account access information provided as a response to a survey, etc.). The wireless voice information is processed (e.g., standardized, cleaned, appended with additional information, etc.) to provide market analysis for the wireless voice market. Additionally, the method may also include outputting the market analysis using at least one of a presentation, a datafeed, and an online access tool enabling a third party to retrieve select portions of the wireless voice information.

And in another embodiment, the above method may also include grouping members of the panel of wireless subscribers into a plurality of groupings based upon a characteristic shared by members of each of the plurality of groupings. The method may further include performing a comparison of a number of members within a select grouping with respect to a predetermined number of people having the characteristic within a predetermined geographical area. A weighting factor may be assigned to members of the select grouping based upon the comparison, wherein an application of the weighing factor to the select grouping provides a panel that is more representative of a population within the predetermined geographical area.

And in yet another embodiment, a computer system may include a processor coupled to a bus and a memory coupled to the bus. The memory includes instructions that when executed on the processor implement a method of providing market analysis for a wireless voice market (e.g., as discussed above).

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
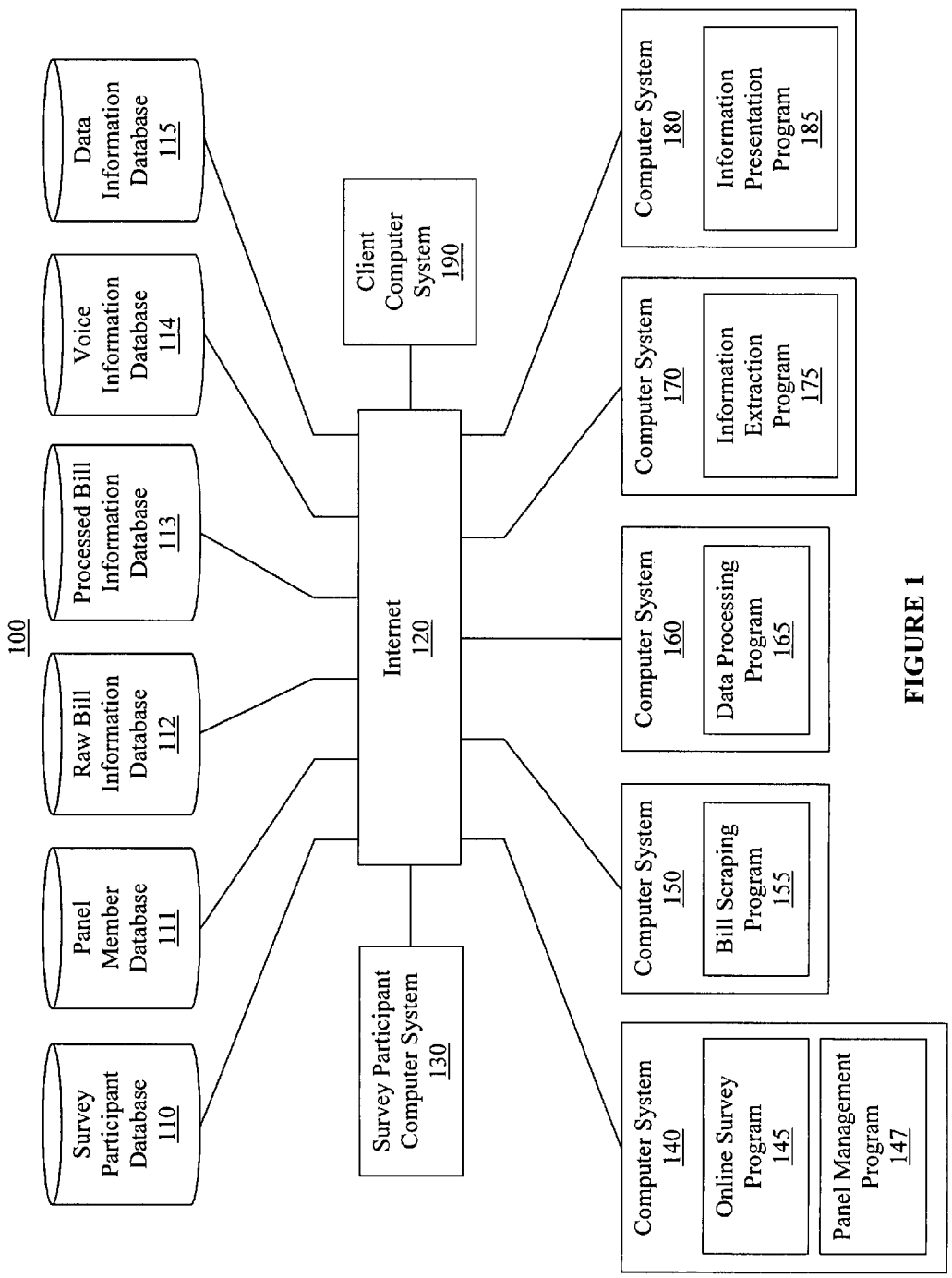
FIG. 1 shows an exemplary system for providing market analysis in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "accepting," "accessing," "adding," "analyzing," "assembling," "assigning," "calculating," "capturing," "combining," "comparing," "collecting," "creating," "defining," "depicting," "determining," "displaying," "establishing," "executing," "generating," "grouping," "identifying," "modifying," "moving," "outputting," "performing," "placing," "presenting," "processing," "programming," "querying," "removing," "repeating," "sampling," "sorting," "storing," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Wireless Market Analysis

FIG. 1 shows exemplary system 100 for providing market analysis in accordance with one embodiment of the present invention. As shown in FIG. 1, a plurality of databases (e.g., survey participant database 110, panel member database 111, raw bill information database 112, processed bill information database 113, voice information database 114 and data information database 115) are coupled to internet 120 for access by a plurality of computer systems (e.g., survey participant computer system 130, computer systems 140-180 and client computer system 190) also coupled to internet 120. Additionally, computer systems 140-180 comprise a plurality of programs (e.g., 145-185) for execution thereon, where each program may perform various voice and data information access, processing, and output functions to provide market analysis (e.g., for the wireless voice and wireless data markets) in accordance with embodiments of the present invention.

As described herein, "wireless voice market" shall refer to a group of existing or potential consumers or organizations which may purchase or utilize a wireless voice product or wireless voice service. Wireless voice products may comprise any system, device, component or item (either offered for free or for cost) enabling transmission and/or receipt of a voice over a wireless system, connection, network, etc. In one embodiment, the term "voice" may refer to one or more voices in a telephone conversation (e.g. between multiple users). Wireless voice services may comprise any service enabling such transmission and/or receipt of a voice, where the wireless voice service may complement or otherwise co-exist with one or more wireless voice products. For example, a wireless voice service may enable a wireless device to communicate with a wireless network in one embodiment.

Additionally, as described herein, "wireless data market" shall refer to a group of existing or potential consumers or organizations which may purchase or utilize a wireless data product or wireless data service. Wireless data products may comprise any system, device, component or item (either offered for free or for cost) enabling transmission and/or receipt of data (e.g., text, video, television, pictures/images, rendering of websites, etc.) over a wireless system, connection, network, etc. In one embodiment, the term "data" may comprise any information other than that used to convey one or more voices in a telephone conversation (e.g. between multiple users). Wireless data services may comprise any service enabling such transmission and/or receipt of data, where the wireless data service may complement or otherwise co-exist with one or more wireless data products. For example, a wireless data service may enable a wireless device to communicate with a wireless network in one embodiment.

Computer system 140 comprises online survey program 145 for administering online surveys such that wireless subscribers (e.g., using computer system 130) may provide survey responses. The surveys may collect various types of information about the wireless subscribers (e.g., demographic information, household characteristic information, personal contact information, wireless plan information, wireless usage information, who pays bill, wireless satisfaction, handset information, etc.), from which a determination is made as to whether the wireless subscriber fits a profile. The profile may be configured in real-time (e.g., as wireless subscribers are accepted, etc.), or alternatively predefined. If a subscriber is found to adequately conform to the profile, the subscriber may be asked to provide information (e.g., username and password) necessary to access their online wireless bill (e.g., via their carrier's website) in exchange for compensation or the like. Any collected information about the subscriber may be stored in survey participant database 110.

If account access information is provided, then the panel management program 147 may verify the information (e.g., accessed from database 110) and choose an appropriate action. For example, if the account access information enables access to the subscriber's online bill, then the subscriber may be promoted to a panel member and information about the subscriber may be stored in panel member database 111. If program 147 is unable to access wireless information from online bills (e.g., amount due for the current month, etc.) after a given number of tries (e.g., varying depending upon the accessed carrier website), then the participant is rejected and may be notified (e.g., via an online interface, email, etc.) of the missing and/or incorrect information.

As shown in FIG. 1, computer system 150 comprises bill scraping program 155 for accessing online bills of panel members (e.g., stored in database 111) and collecting voice and/or data information for panel members. The information may be collected more frequency (e.g., every day) or less frequently (e.g., once a week, every other week, etc.). Program 155 may "spider" (e.g., identifying and selecting hyperlinks on an internet webpage, etc.) the carrier's website to locate different portions of the online bill (e.g., by clicking on tabs corresponding to different information sections of the online bill), thereby improving the accuracy and completeness of the wireless information and resulting market analysis. Additionally, raw information collected from the online bills may be stored in raw bill information database 112.

Computer system 160 comprises data processing program 165 for accessing raw bill information (e.g., from database 112), processing the information, and storing the processed bill information (e.g., in processed bill information database 113, voice information database 114 and/or data information database 115). The processing may comprise determining a representative bill (e.g., a single bill with representative values, averaged values from multiple bills, etc.) for a predetermined period of time for each panel member, where the information from the representative bills may be stored in database 113. The processing may also comprise standardizing the information (e.g., choosing a common name for similar fields across different carriers, etc.), cleaning the information (e.g., removing unnecessary characters, correcting misspelled words, correcting incomplete names/titles by comparing to a list of known names/titles, etc.), classifying the information (e.g., grouping data into categories, subcategories, etc.) and applying additional information (e.g., census information, user-supplied information, etc.) to provide more detailed and/or further market analysis.

Additionally, processing performed by program 165 may comprise performing quality control on the voice and/or data information (e.g., stored in databases 112-115). The quality control processes may comprise comparing total/summary fields with a sum of fields contributing to the total. If the sum does not match the total, then the data is erroneous and may be reacquired and/or processed. Additionally, it should be appreciated that other quality control processes may be carried out on the information to verify its accuracy, completeness, etc.

Program 165 may also process information acquired at different times to show trending or the like. The information from the different time periods may be accessed and compared, thereby enabling the storage of information (e.g., in database 113, 114 and/or 115) relating to changes in the voice and/or data information over time. The trending information may be subsequently accessed similar to the voice and/or data information for providing market analysis.

As shown in FIG. 1, computer system 170 comprises information extraction program 175 for extracting voice and/or data information (e.g., from databases 114 and/or 115) and outputting the information. The information may be output via a datafeed (e.g., in a format such as CSV, SPSS, XML, etc.) or the like to provide wireless voice and/or data market analysis.

Computer system 180 comprises information presentation program 185 for presenting voice and/or data information (e.g., stored in databases 114 and 115, respectively). The information may be presented in the form of a chart, table, spreadsheet, Powerpoint presentation, etc. Alternatively, program 185 may comprise an online information access tool, whereby clients may access selected portions (e.g., using client computer system 190) of the voice and/or data market analysis. And in another embodiment, clients may be provided other software programs (e.g., for installation on system 190) for accessing the voice and/or data market analysis.

As such, the output market analysis (e.g., from program 175 and/or 180) may be used to develop a better understanding of a given market and/or consumer segment (e.g., of a wireless voice market, wireless data market, etc.). In one embodiment, the analysis may comprise one or metrics used to understand a given market or market segment. For example, metrics may enable comparison of market share across a plurality of carriers, market penetration across a plurality of carriers, averaged voice and/or data information, and other metrics which alternatively combine and/or organize the market information.

Although FIG. 1 depicts a plurality of databases and computer systems coupled via internet 120, it should be appreciated that the databases and/or computer systems may be alternatively (e.g., directly, indirectly via another system, etc.) coupled in other embodiments. Additionally, although programs (e.g., 145-185), computer systems (e.g., 130-190) and databases (e.g., 110-115) are depicted in FIG. 1 as separate blocks, it should be appreciated that one or more of the programs, computer systems, databases, or any combination thereof, may be combined in other embodiments. Although FIG. 1 depicts a specific number of programs, computer systems and databases, it should be appreciated that a larger or smaller number of programs, computer systems and/or databases may be used in other embodiments. Further, although a specific number of programs are depicted within each computer system, it should be appreciated that each computer system may comprise a larger or smaller number of programs in other embodiments.

Panel Assembly and Maintenance

Figure 2:
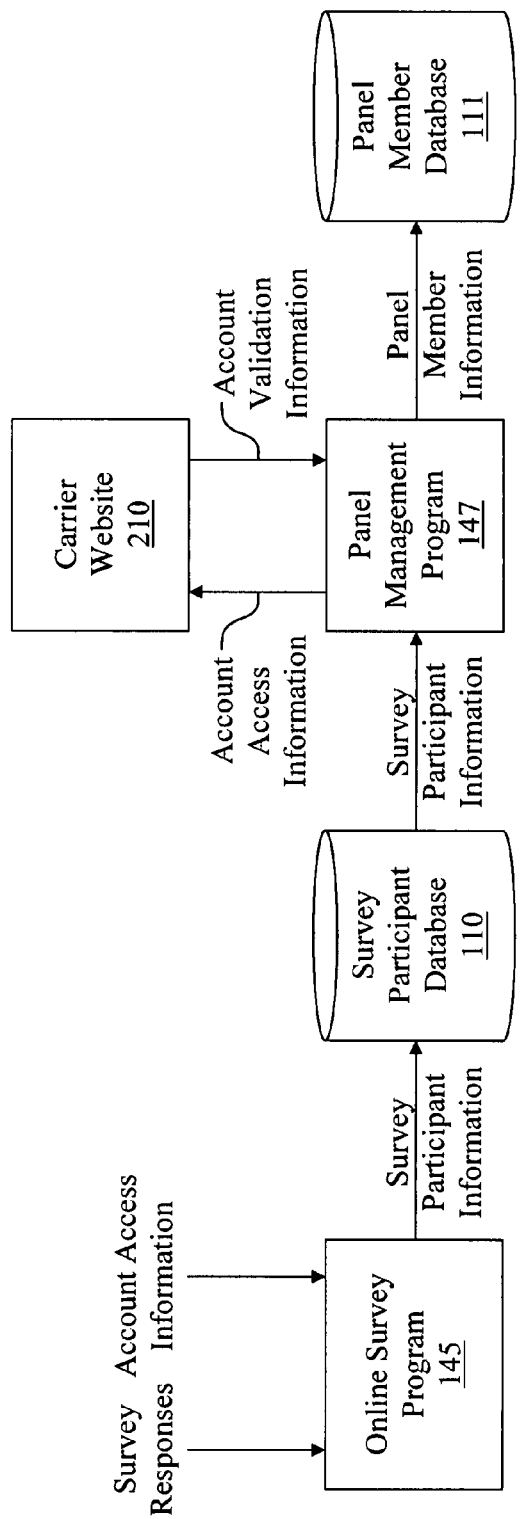
FIG. 2 shows an exemplary system for determining a panel of wireless subscribers in accordance with one embodiment of the present invention.

FIG. 2 shows exemplary system 200 for determining a panel of wireless subscribers in accordance with one embodiment of the present invention. As shown in FIG. 2, online survey program 145 may accept survey responses and/or account access information. In response to administering surveys to wireless subscribers (e.g., using system 130 of FIG. 1), program 145 may receive survey responses which may comprise demographic information, personal contact information, wireless plan information, wireless usage information, who pays bill, wireless satisfaction, handset information, etc. If the survey respondent is determined to fit a profile (predefined or configured in real-time as discussed above with respect to FIG. 1), then the subscriber may provide account access information to program 145. Any information collected about the survey participant may be stored in a database (e.g., survey participant database 110) for later access.

Panel management program 147 may access survey participant information stored within database 110 and use the accessed information to perform an initial verification of the account access information. Program 147 may attempt to access the wireless account of carrier website 210 (e.g., identified by the subscriber during the survey) using the supplied account access information. If problems occur during verification (e.g., outage of website 210), the verification may repeat. If verification fails after a select number of attempts, then the participant may be notified of the missing/incorrect information. If the account is accessible, then account validation information (e.g., portions of the online bill to confirm accessibility) may be returned to program 145.

Program 145 may determine whether the account access information was accurate and complete to provide access to relevant portions of the online bill. If the account access information was somehow insufficient, then the participant may be notified of the missing/incomplete information. However, if the account access information was accurate and complete, then the participant may be promoted to a panel member. Any information collected about the panel member (e.g., up to that point, in the future, etc.) may be stored in a database (e.g., panel member database 111) for later access.

Figure 3A:
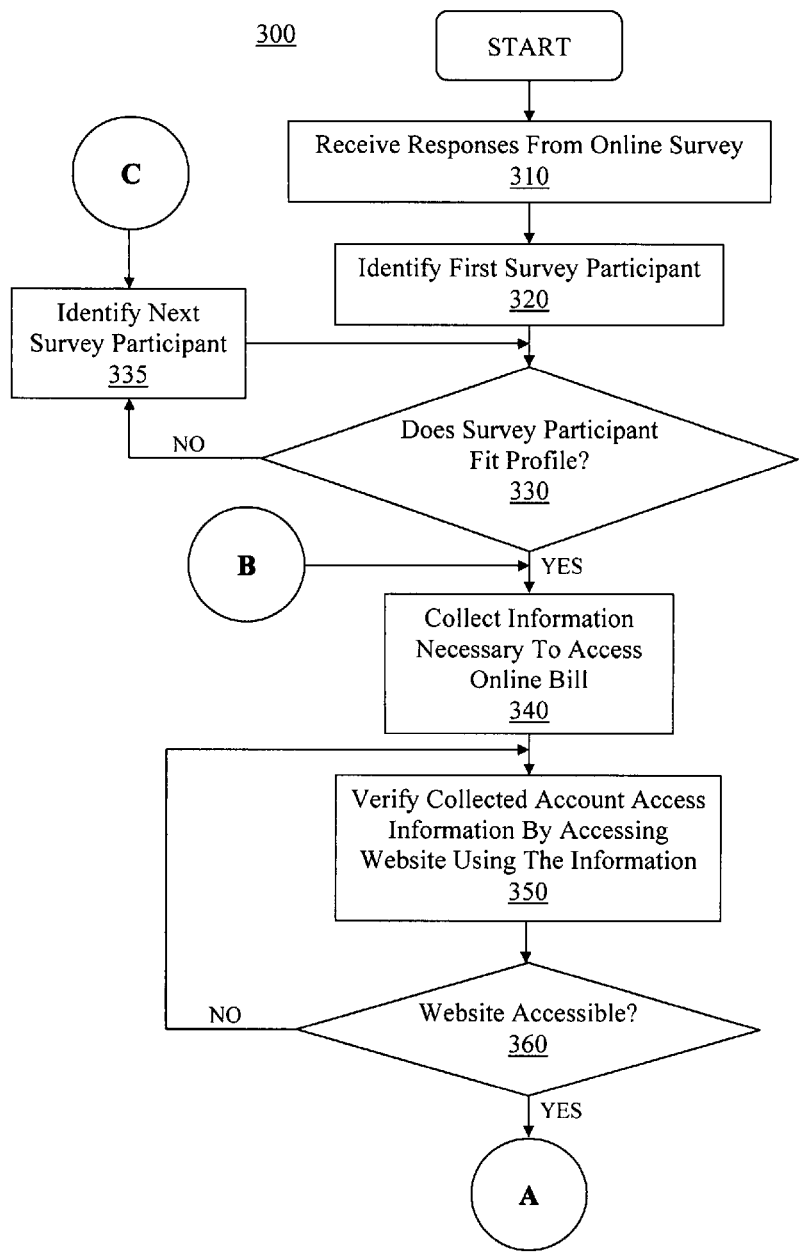
FIG. 3A shows a first portion of an exemplary computer-implemented process for determining a panel of wireless subscribers in accordance with one embodiment of the present invention.
Figure 3B:
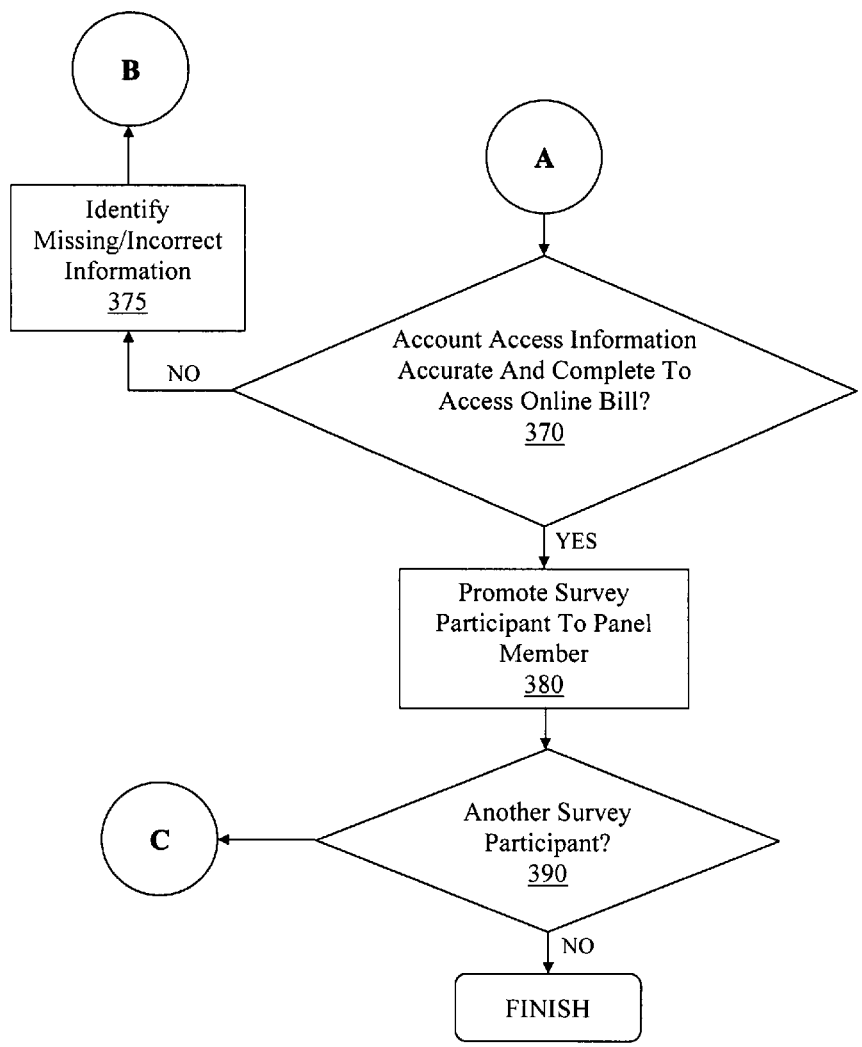
FIG. 3B shows a second portion of an exemplary computer-implemented process for determining a panel of wireless subscribers in accordance with one embodiment of the present invention.

FIGS. 3A and 3B show exemplary computer-implemented process 300 for determining a panel of wireless subscribers in accordance with one embodiment of the present invention. As shown in FIG. 3A, step 310 involves receiving responses from an online survey. The online survey may ask a series of questions to return a variable range of responses of wireless subscribers (e.g., demographic information, personal contact information, wireless plan information, wireless usage information, who pays bill, wireless satisfaction, handset information, etc.).

As shown in FIG. 3A, step 320 involves identifying a first survey participant. A determination may then be made in step 330 as to whether the identified survey participant fits a profile. The profile may be predefined, determined in real-time, etc. If the identified survey participant is determined to not fit the profile, then a next survey participant may be identified in step 335 and step 330 may then be repeated for the next survey participant identified. Alternatively, if the identified survey participant is determined to fit the profile, then any information (e.g., username, password, etc.) necessary to access the participant's online bill is collected in step 340.

Step 350 involves verifying the collected account access information by accessing a website (e.g., carrier website 210 of FIG. 2) using the information. If a determination is made in step 360 that the website (e.g., 210) is not accessible, then step 350 may repeat. However, if the website (e.g., 210) is accessible, then a determination may be made in step 370 of FIG. 3B whether the account access information is accurate and complete to access relevant portions of the online bill. If the information is found to be inaccurate and/or incomplete, then the participant may be notified of the missing/incorrect information in step 375 and steps 340 through 360 may repeat. Alternatively, if the account access information is found to be accurate and complete in step 370, then the participant may be promoted to a panel member in step 380.

As shown in FIG. 3B, step 390 involves determining whether another survey participant exists. If another survey participant is found to exist, then the next survey participant may be identified in step 335 and steps 330 through 380 may repeat. Alternatively, if another survey participant is not found to exist, process 300 may terminate.

Figure 4:
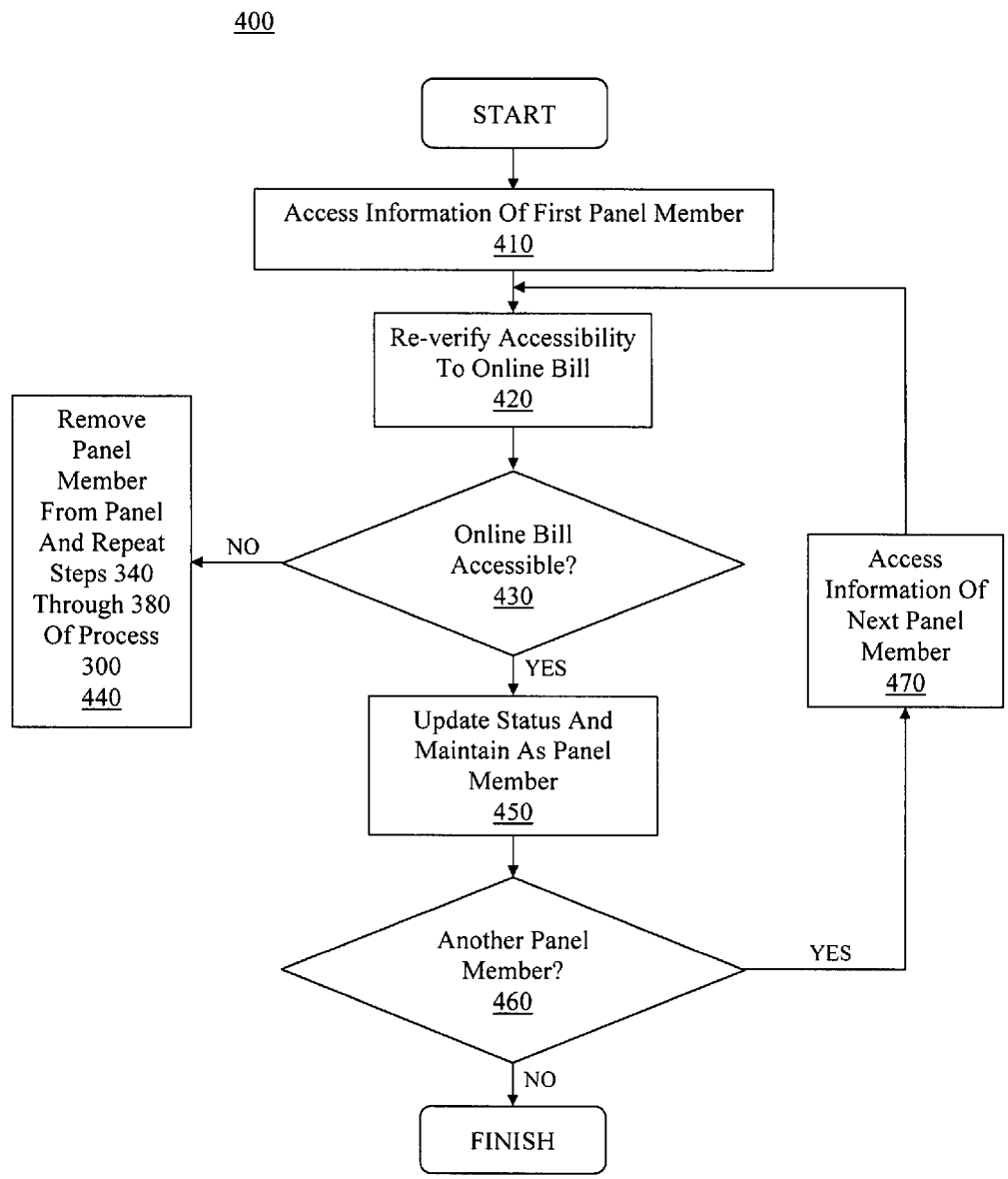
FIG. 4 shows an exemplary computer-implemented process for maintaining a panel of wireless subscribers in accordance with one embodiment of the present invention.

FIG. 4 shows exemplary computer-implemented process 400 for maintaining a panel of wireless subscribers in accordance with one embodiment of the present invention. As shown in FIG. 4, step 410 involves accessing information of a first panel member. Accessibility to the online bill of the panel member may be re-verified in step 420 by, for example, accessing an associated carrier website (e.g., 210 of FIG. 2) using the account access information provided by the panel member.

A determination may be made in step 430 as to whether relevant portions of the online bill are accessible. If portions are not accessible, then the panel member may be removed from the panel and steps 340 through 380 of process 300 may be repeated. Alternatively, if the relevant portions of the online bill are accessible, then the status of the panel member may be updated (e.g., in panel member database 111) and the member maintained as a panel member.

As shown in FIG. 4, step 460 involves making a determination as to whether another panel member exists. If another panel member is found to exist, then the account access information of the next panel member may be accessed in step 470 and steps 420 through 450 may repeat for the next panel member. Alternatively, if another panel member is not found to exist, then process 400 may terminate.

Weighting

Figure 5A:
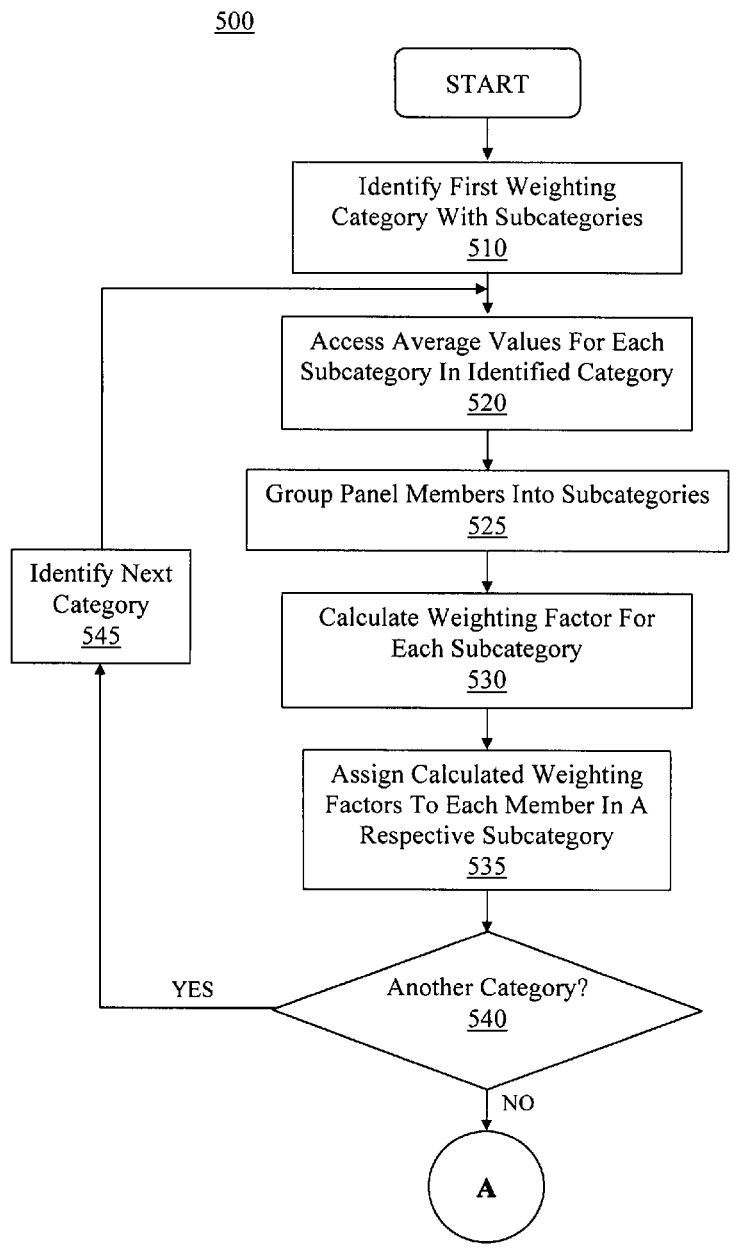
FIG. 5A shows a first portion of an exemplary computer-implemented process for assigning weighting factors to a panel of wireless subscribers in accordance with one embodiment of the present invention.
Figure 5B:
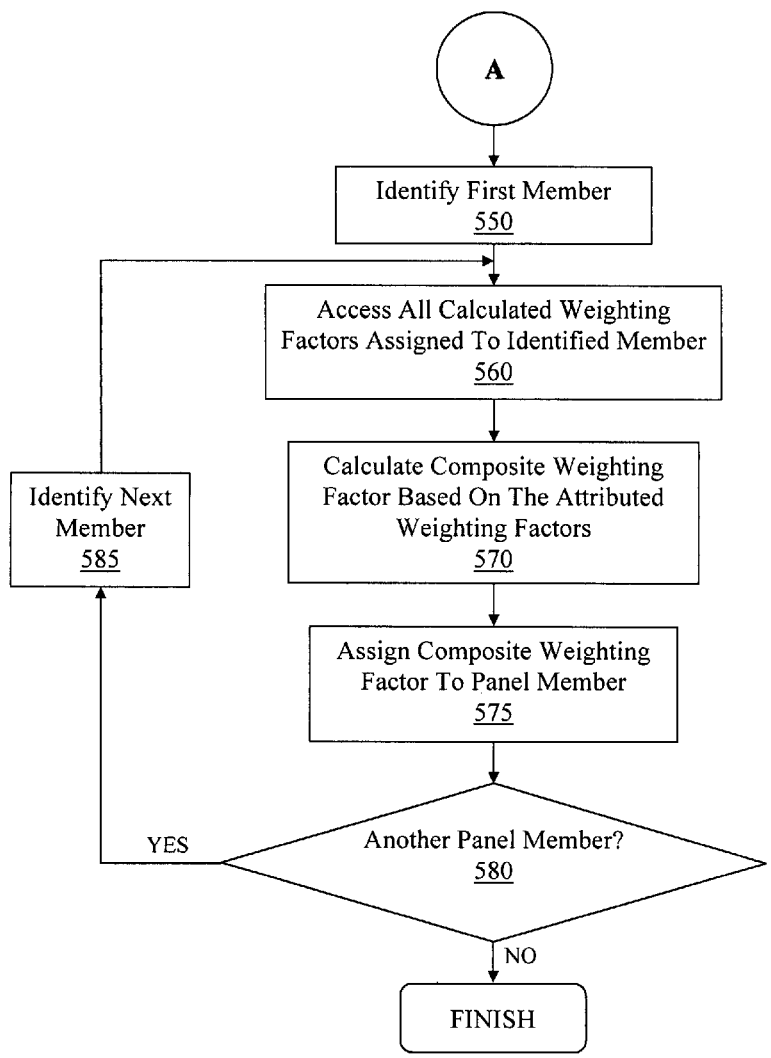
FIG. 5B shows a second portion of an exemplary computer-implemented process for assigning weighting factors to a panel of wireless subscribers in accordance with one embodiment of the present invention.

FIGS. 5A and 5B show exemplary computer-implemented process 500 for assigning weighting factors to a panel of wireless subscribers in accordance with one embodiment of the present invention. As shown in FIG. 5A, step 510 involves identifying a first weighting category (e.g., demographics, wireless subscriber characteristics, carrier characteristics, etc.) with subcategories (e.g., age, race/ethnicity, gender, marital status, employment, number of people in household, income, time on same wireless plan or with same carrier, wireless subscriber penetration of carrier, wireless market share of carrier, etc.).

Step 520 involves accessing average values for each subcategory in the identified category. The average values may be obtained from third-party data (e.g., the census, public knowledge about wireless carriers, etc.) and may represent an average value or number for each subcategory within a given geographical area (e.g., the United States, a state, a city, etc.).

As shown in FIG. 5A, step 525 involves grouping panel members into subcategories (e.g., those for which average values were obtained). The groupings may indicate a number of panel members within each subcategory. Alternatively, a percentage of total panel members may be determined for each subcategory (e.g., within a given category).

Thereafter, a weighting factor may be calculated for each subcategory in step 530. The weighting factor may be determined by dividing the average value for a subcategory by the number and/or percentage of panel members in the subcategory. The calculated weighting factors may then be assigned in step 535 to each member within a respective subcategory.

As shown in FIG. 5A, step 540 involves determining whether another category exists. If another category is found to exist, then the next category may be identified in step 545 and steps 510 through 535 may be repeated for the next category.

As shown in FIG. 5B, step 550 involves identifying a first member (e.g., from the panel of wireless subscribers). Thereafter, all calculated weighting factors assigned to the identified member may be accessed in step 560. For example, multiple weighting factors may have been calculated (e.g., in step 530) for a given panel member if that member was grouped into multiple subcategories (e.g., a given age grouping, a given income range, etc.).

Step 570 involves calculating a composite weighting factor for the panel member identified in step 550. In one embodiment, an average of all weighting factors assigned to the member may be calculated to generate the composite weighting factor. In another embodiment, a formula assigning a higher importance to certain subcategories (e.g., a race weighting factor may dominate an age weighting factor, etc.) may be used to calculate the composite weighting factor. Alternatively, it should be appreciated that other computational methods may be used to calculate the composite weighting factor (e.g., to make the panel more representative of a larger population).

As shown in FIG. 5B, step 575 involves assigning the composite weighting factor to the identified panel member. As such, the composite weighting factor may add or subtract weight to the identified panel member (e.g., when the wireless voice and/or data information is accessed to provide wireless market analysis), thereby providing and efficient and effective mechanism to increase the representation in the panel of underrepresented subcategories. It should be appreciated that the population may be defined in various ways, which may comprise geographical limitations (e.g., the United States), a previously defined population (e.g., by a report, contained in a database, etc.), or the like.

Step 580 involves determining whether another panel member exists. If another panel member is found to exists, then the next panel member may be identified in step 585. If another panel member is not found to exist, then process 500 may terminate.

Wireless Voice Information Used For Market Analysis

Figure 6:
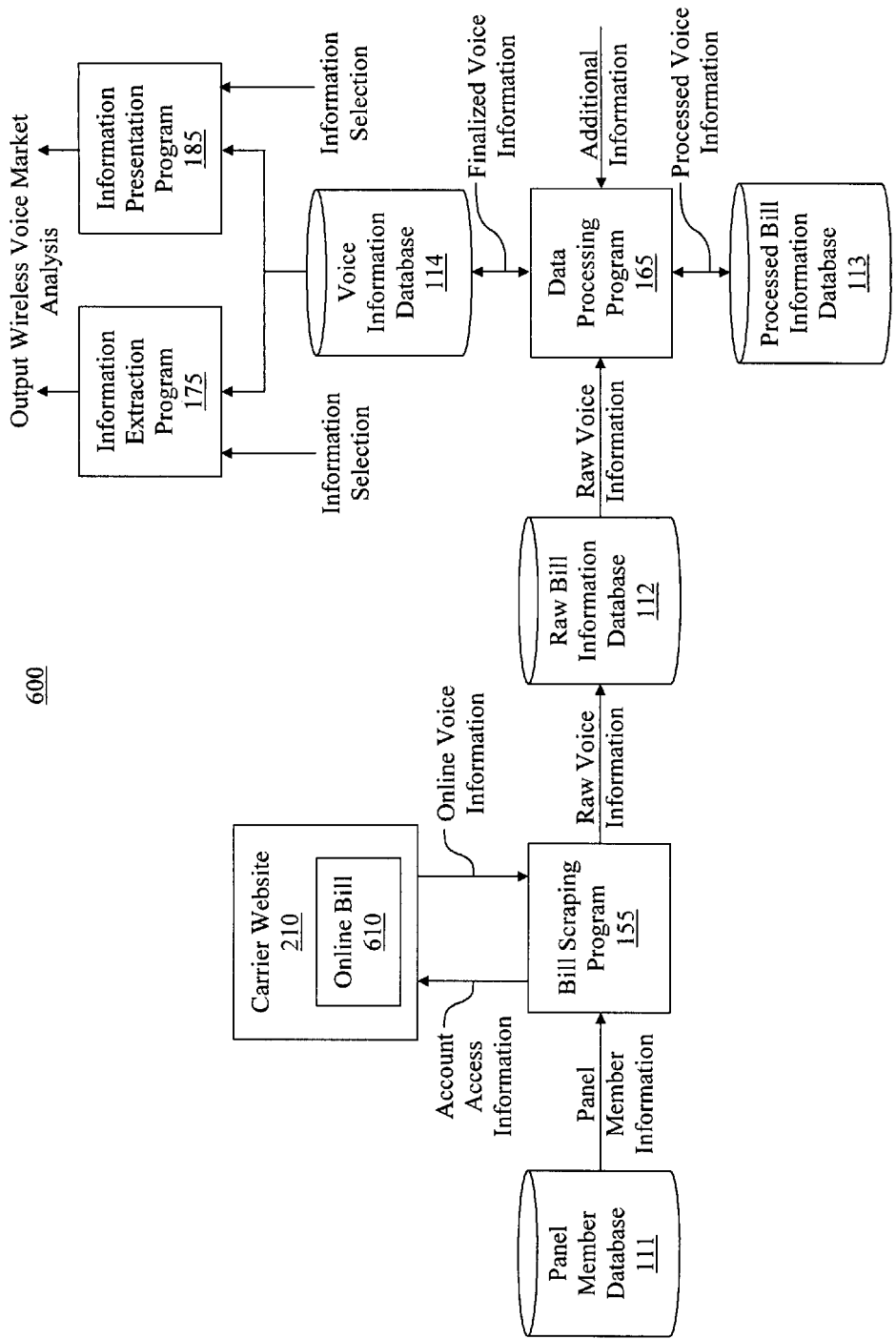
FIG. 6 shows an exemplary system for providing market analysis for a wireless voice market in accordance with one embodiment of the present invention.

FIG. 6 shows exemplary system 600 for providing market analysis for a wireless voice market in accordance with one embodiment of the present invention. As shown in FIG. 6, bill scraping program 155 may access panel member information (e.g., account access information for panel members, etc.) from panel member database 111. Program 155 may access online voice information from online bill 610 via providing account access information to carrier website 210. After performing the necessary steps to access the online voice information (e.g., clicking tabs on the website to access relevant portions of bill 610, etc.), program 155 may store the accessed raw voice information in raw bill information database 112.

Data processing program 165 may access raw voice information (e.g., from database 112), perform processing on the accessed information, and store the processed information (e.g., in database 113, database 114 and/or database 115). The processing may comprise determining a representative bill (e.g., a single bill with representative values, averaged values from multiple bills, etc.) for a predetermined period of time for each panel member, where the processed voice information from the representative bills may be stored in processed bill information database 113. The processing performed by program 165 may also comprise standardizing the voice information (e.g., choosing a common name for similar fields across different carriers, averaging a member's bill totals over a predetermined period of time to generate a Billed Revenue Per Subscriber (BRPS) value that can be compared to subscribers of other carriers, etc.), cleaning the voice information (e.g., removing unnecessary characters, correcting misspelled words, correcting incomplete names/titles by comparing to a list of known names/titles, etc.), and applying additional information (e.g., census information, user-supplied information, etc.) input to program 165 to provide more detailed and/or further market analysis.

Additionally, processing performed by program 165 may comprise performing quality control on the voice and/or data information (e.g., stored in databases 112-115). The quality control processes may comprise comparing total/summary fields with a sum of fields contributing to the total. If the sum does not match the total, then the data is erroneous and may be reacquired and/or processed. Additionally, it should be appreciated that other quality control processes may be carried out on the information to verify its accuracy, completeness, etc.

Program 165 may also process information acquired at different times to show trending or the like. The information from the different time periods may be accessed and compared, thereby enabling the storage of information (e.g., in database 113, 114 and/or 115) relating to changes in the voice and/or data information over time. The trending information may be subsequently accessed similar to the voice and/or data information for providing market analysis.

After program 165 completes processing of the voice information, finalized voice information may be stored in voice information database 114. Thereafter, the finalized voice information may be accessed by information extraction program 175 (e.g., to provide wireless voice market analysis in the form of a datafeed) and/or information presentation program 185 (e.g., to provide wireless voice market analysis via an online software user interface, a software user interface installed on a client computer, a presentation using spreadsheets, charts, tables, etc.). The finalized information may be accessed in response to an information selection input (e.g., to program 175), where the input may be from a system, device, user, etc. The input may identify a market for which market analysis is sought, one or more characteristics or attributes of a market for which market analysis is sought, etc. As such, the information input may be used to customize and/or adjust the market analysis output.

Figure 7:
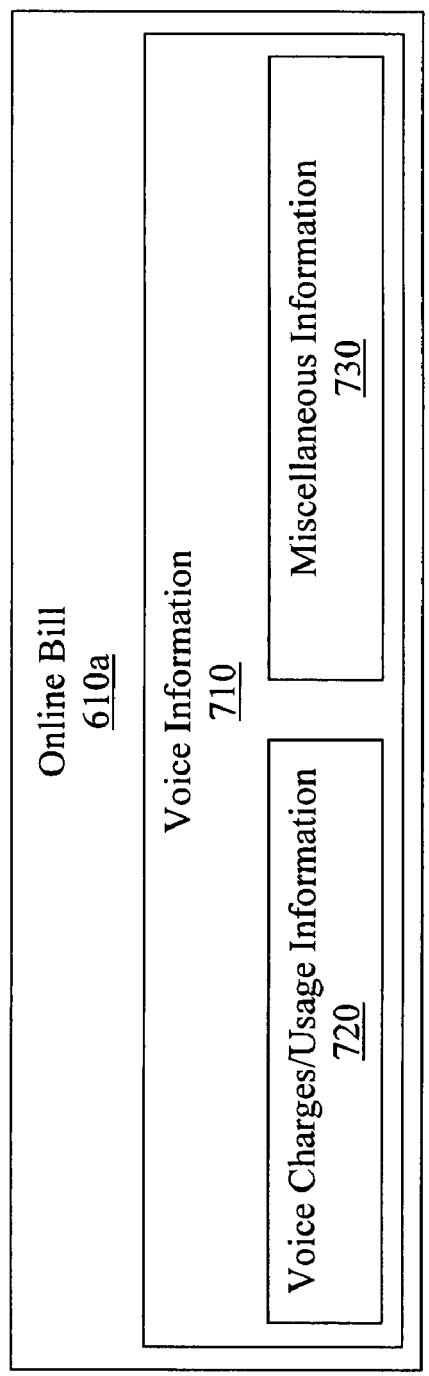
FIG. 7 shows an exemplary online bill with wireless voice information in accordance with one embodiment of the present invention.

FIG. 7 shows exemplary online bill 610*a* with wireless voice information in accordance with one embodiment of the present invention. Bill 610*a* comprises voice information 710, where voice information 710 may comprise voice charges/usage information 720 and miscellaneous information 730.

Voice charges/usage information 720 may comprise information regarding voice charges and/or voice usage. For example, voice charges may comprise overage charges, long distance charges (e.g., domestic, international, etc.), roaming charges, 411 charges, charges relating to time of use (e.g., anytime, peak, off-peak, etc.), mobile assist charges, voice service charges, handset insurance charges, dialing discount charges, push-to-talk charges, etc. Voice usage may comprise total voice minutes used (e.g., anytime, peak, off-peak, mobile-to-mobile, roaming, overage, etc.), number of calls sent/received, call duration, number of 411 calls placed, push-to-talk minutes used, etc. As such, information 720 may be used to provide wireless voice market analysis as discussed herein.

Miscellaneous information 730 may be used to provide further and/or more detailed wireless voice market analysis. In one embodiment, information 730 may comprise information related to a wireless device (e.g., a type, model, features of the device, what services are available for the device, equipment charges for the device, etc.). In another embodiment, information 730 may comprise information related to a wireless plan (e.g., plan type, plan price, calling area, plan attributes, plan allowances, available minutes, overage charges and thresholds, add-on package charges, available data downloads, etc.). And in yet another embodiment, information 730 may comprise other information accessible from wireless bill 610*a* (e.g., taxes and other fees, number of associated accounts, credits, late fees, etc.).

Figure 8:
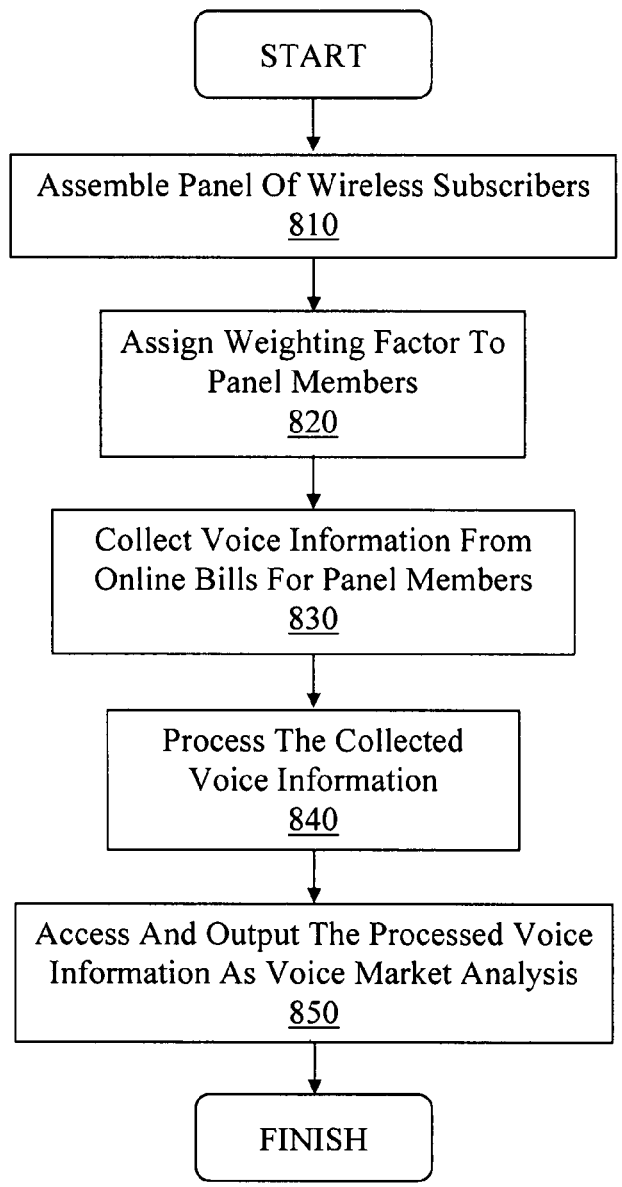
FIG. 8 shows an exemplary computer-implemented process for providing market analysis for a wireless voice market in accordance with one embodiment of the present invention.

FIG. 8 shows exemplary computer-implemented process 800 for providing market analysis for a wireless voice market in accordance with one embodiment of the present invention. As shown in FIG. 8, step 810 involves determining a panel of wireless subscribers (e.g., as discussed above with respect to FIGS. 2, 3A and 3B). A weighting factor (e.g., a composite weighting factor) may be assigned to panel members (e.g., as described above with respect to FIGS. 5A and 5B) in step 820.

Figure 9:
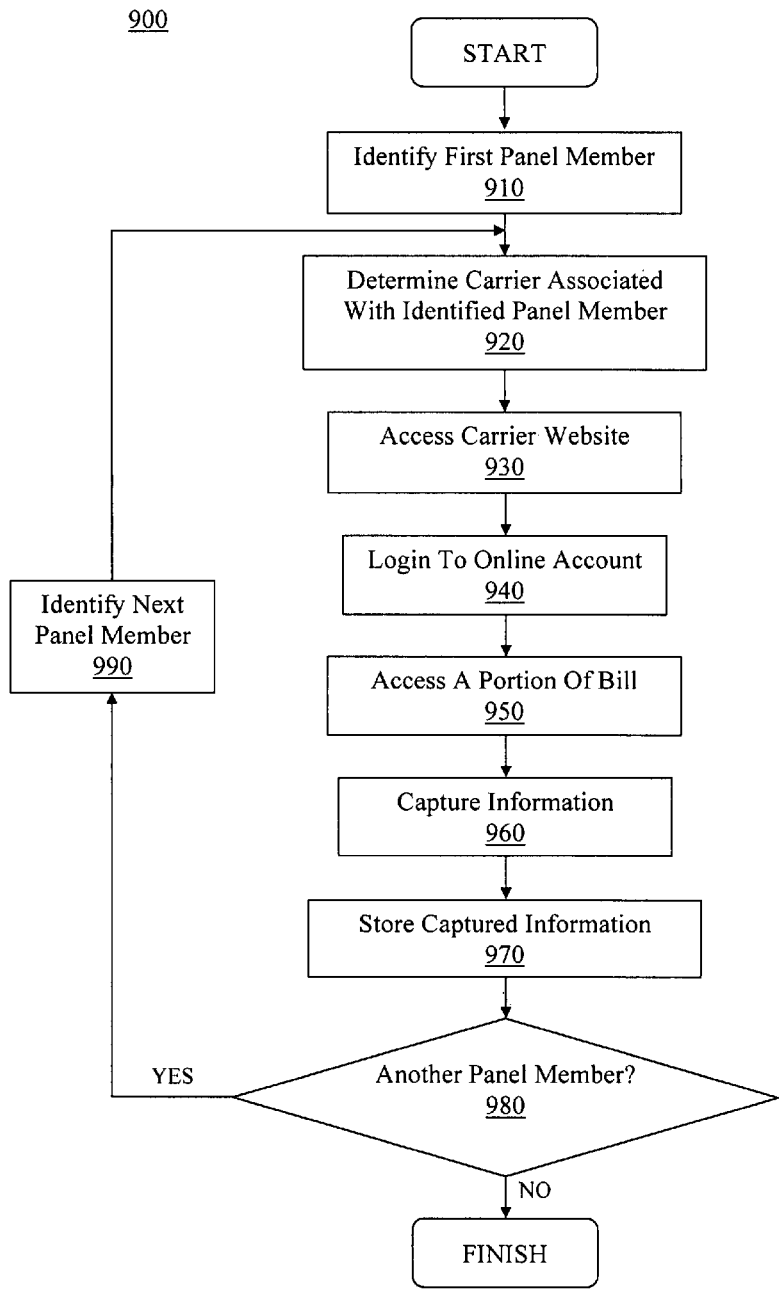
FIG. 9 shows an exemplary computer-implemented process for collecting voice information from online bills in accordance with one embodiment of the present invention.

Step 830 involves collecting voice information from online bills of the panel members (e.g., in accordance with process 900 of FIG. 9). The information may be scraped (e.g., by program 155) from the online bills (e.g., 610) after accessing a carrier website (e.g., 210).

Figure 11:
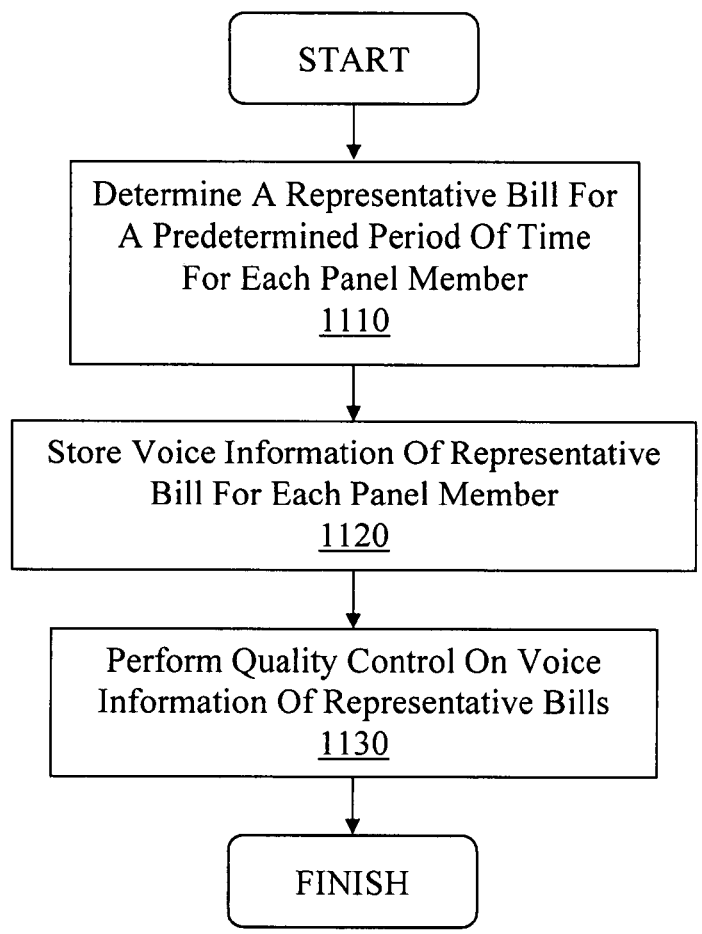
FIG. 11 shows an exemplary computer-implemented process for performing initial processing of voice information in accordance with one embodiment of the present invention.
Figure 12:
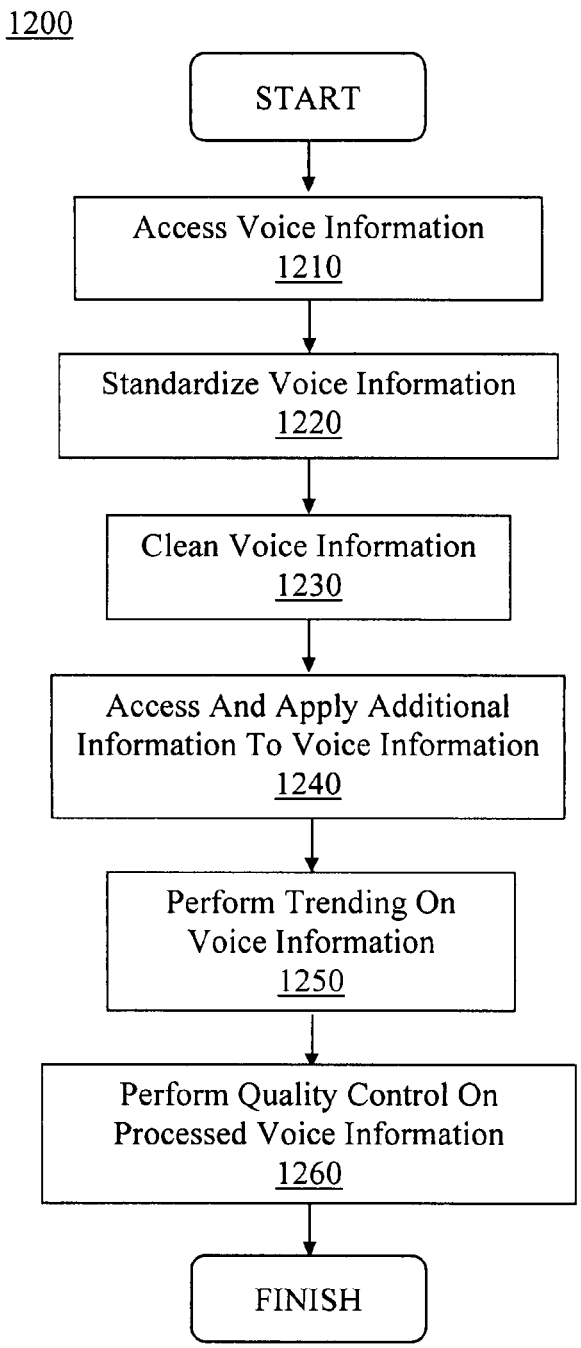
FIG. 12 shows an exemplary computer-implemented process for processing voice information in accordance with one embodiment of the present invention.

As shown in FIG. 8, step 840 involves processing the collected voice information (e.g., in accordance with process 1100 of FIG. 11 and/or process 1200 of FIG. 12). Processing may be performed (e.g., by program 165) to determine a representative bill. Additionally, the processing may comprise quality control, trending, standardization, cleaning, and/or applying additional information to the voice information to further and/or more detailed voice market analysis.

Figure 13:
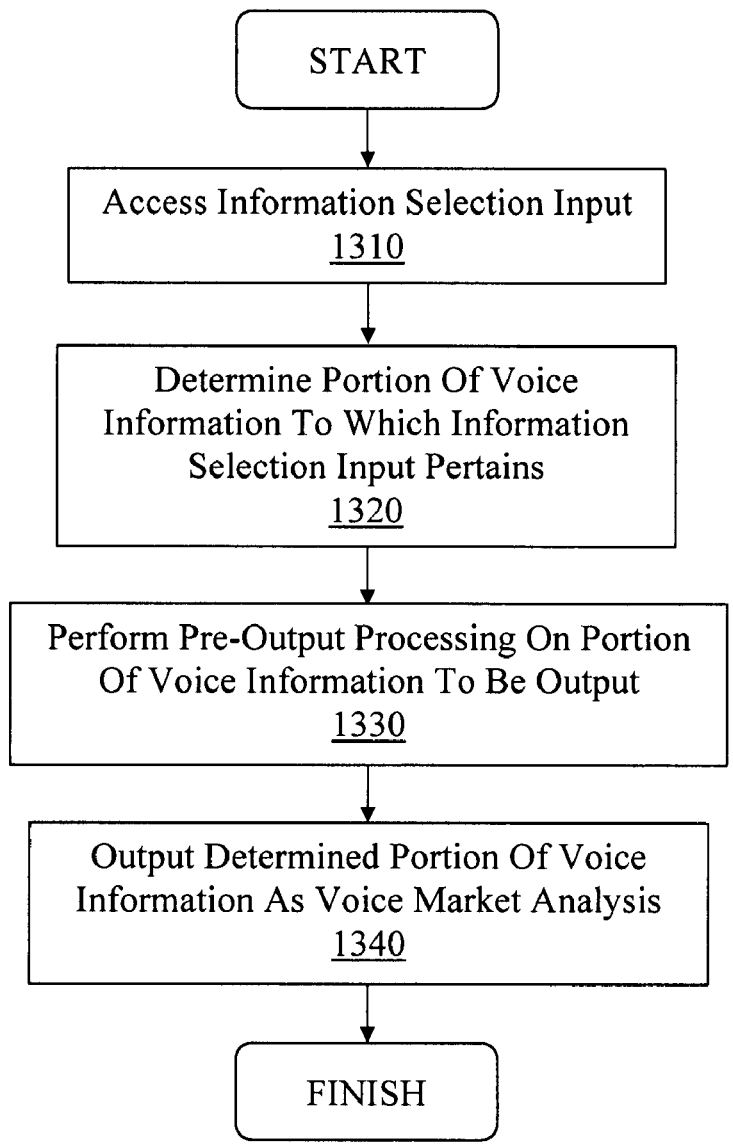
FIG. 13 shows an exemplary computer-implemented process for outputting voice information in accordance with one embodiment of the present invention.

As shown in FIG. 8, step 850 involves accessing and outputting the processed voice information as voice market analysis (e.g., in accordance with process 1300 of FIG. 13). The information may be output by numerous delivery mechanisms. For example, a datafeed may be established (e.g., using program 175) to transmit (e.g., stream, etc.) the information to another device, component, system, etc. In another embodiment, the voice information may be presented (e.g., using spreadsheets, charts, tables, etc.) and/or accessed using a user interface program (e.g., online user interface, user interface installed on a client computer system, etc.).

FIG. 9 shows exemplary computer-implemented process 900 for collecting voice information from online bills in accordance with one embodiment of the present invention. As shown in FIG. 9, step 910 involves identifying a first panel member. A carrier associated with the identified panel member is determined in step 920, and may be performed in accordance with process 1000 of FIG. 10.

Step 930 involves accessing a website (e.g., 210) of the determined carrier. The online account may then be logged into in step 940 (e.g., using account access information provided by the panel member). A portion of the bill may then be accessed in step 950, which may involve locating a correct screen on the website to display the online bill, clicking on appropriate portions/links in the website to display relevant portions (e.g., those displaying voice information, miscellaneous information, etc.) of the bill, or the like.

After relevant portions of the online bill have been accessed, the accessed information may be captured in step 960 and stored in step 970. It should be appreciated that the information may be captured and stored using copy and paste operations, screen capture and OCR operations, or the like.

After the information has been captured and stored for the identified member, a determination may be made in step 980 as to whether another panel member exists. If it is determined that another panel member exists, then a next panel member may be identified in step 990. If another panel member does not exist, then process 900 may terminate.

Figure 10:
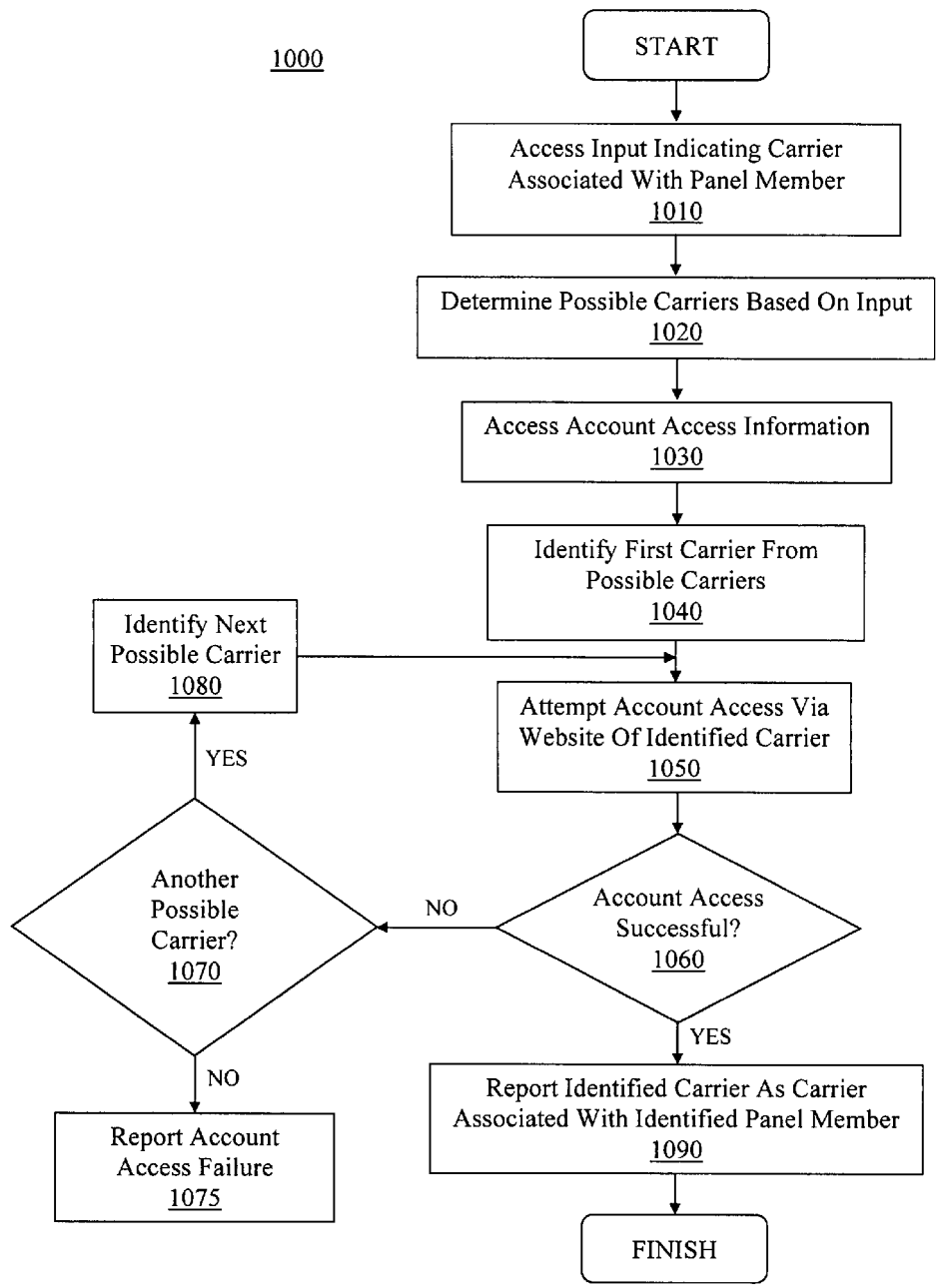
FIG. 10 shows an exemplary computer-implemented process for determining a carrier associated with a wireless subscriber in accordance with one embodiment of the present invention.

FIG. 10 shows exemplary computer-implemented process 1000 for determining a carrier associated with a wireless subscriber in accordance with one embodiment of the present invention. As shown in FIG. 10, step 1010 involves accessing an input indicating a carrier associated with a panel member. The input may be provided by a user as part of a survey response.

Upon accessing an input indicating a carrier, a list of possible carriers based on the indicated carrier may be generated in step 1020. More than one possible carrier may exist due to inaccuracies in the information supplied by the user. For example, a survey participant may incorrectly indicate that company X is the carrier with which the participant has a business relationship, when in actuality the participant is in a business relationship with company Y (e.g., due to a recent merger, buyout, or other business reorganization). As such, the listing may comprise company X, company Y, and any other business entity that may foreseeably be associated with the subscriber based on the user input indicating a carrier.

As shown in FIG. 10, step 1030 involves accessing account access information. The account access information may be provided as part of a survey response, and may be accessed from an appropriate database (e.g., 111).

Step 1040 involves identifying a first carrier from the list of possible carriers (e.g., compiled in step 1020). An account access may be attempted via the website (e.g., 210) of the identified carrier in step 1050. Step 1060 involves making a determination whether the account access is successful. If the account access was not successful, then a determination may be made in step 1070 whether another possible carrier exists. If another possible carrier exists (e.g., from the listing generated in step 1020), then the next carrier may be identified in step 1080 and step 1050 may be repeated for the next carrier. Alternatively, if another possible carrier is not found to exist in step 1070, then an account access failure may be reported in step 1075.

Alternatively, if the account access in step 1060 is found to be successful, then the identified carrier may be reported as the carrier associated with the identified panel member. Thereafter, process 1000 may terminate.

FIG. 11 shows exemplary computer-implemented process 1100 for performing initial processing of voice information in accordance with one embodiment of the present invention. As shown in FIG. 11, step 1100 involves determining a representative bill for a predetermined period of time for each panel member. Given the inherent efficiency of the bill scraping process described herein (e.g., with respect to FIG. 9), duplicative or otherwise superfluous information may be compiled due to frequent (e.g., every day, etc.) bill scraping. As such, a representative bill may be compiled to represent a given time period (e.g., a representative monthly bill, etc.). The representative bill may comprise a single bill with representative values for a predetermined period of time (e.g., monthly intervals, etc.) for each panel member. Alternatively, the representative bill may comprise averaged values from multiple bills for a predetermined period of time for each panel member. After compiling representative bills, the processed voice information from the representative bills may be stored (e.g., in database 113) for each panel member in step 1120.

Step 1130 involves performing quality control on voice information of representative bills. The quality control may comprise comparing total/summary fields with a sum of fields contributing to the total. If the sum does not match the total, then the data is erroneous and may be reacquired and/or processed. Additionally, it should be appreciated that other quality control processes may be carried out on the information to verify its accuracy, completeness, etc.

FIG. 12 shows exemplary computer-implemented process 1200 for processing voice information in accordance with one embodiment of the present invention. As shown in FIG. 12, step 1210 involves accessing voice information. The voice information may be that scraped from an online bill of a panel member. Additionally, the voice information may be accessed by a program (e.g., 165) from a database (e.g., 112) storing the voice information.

Step 1220 involves standardizing the voice information. For example, a common name may be chosen for similar fields of different carriers. As such, a more accurate and meaningful comparison can be made of voice information from one carrier to that of another carrier.

As shown in FIG. 12, step 1230 involves cleaning the voice information. For example, unnecessary characters may be removed, misspelled words may be corrected, incomplete names/titles may be corrected by comparing to a list of known names/titles, etc. As such, the voice information may be more easily accessed, processed, etc. Moreover, clean information increases the accuracy of resulting market analysis by promoting more accurate comparisons, groupings, and the like.

Step 1240 involves accessing and applying additional information to the voice information. The additional information can be supplied by a third party (e.g., census information), the panel member (e.g., user-supplied information), or other sources. When applied to the existing voice information, the additional information enables further grouping and organizing to enable further and/or more detailed voice market analysis. For example, applying income data (e.g., from surveys, average income information from the census, etc.) to the voice information enables the panel members to be grouped into income ranges. As such, market analysis may then show, for example, that one carrier not only enjoys more revenue for overages from all its subscribers, but receives more revenue than any other carrier for overage usage by those in the $100K to $150K income range.

As shown in FIG. 12, step 1250 involves performing trending on voice information. Voice information may be accessed over time, such that changes over time may be provided as part of the voice market analysis. For example, voice information from the different time periods may be accessed and compared, thereby enabling the storage of information (e.g., in database 113, database 114, etc.) relating to changes in the voice information over time. The trending information may be subsequently accessed similar to other voice information discussed thus far for providing wireless voice market analysis.

Step 1260 involves performing quality control on the processed voice information. Quality control processes may be applied as discussed above with respect to step 1130 of FIG. 11.

FIG. 13 shows exemplary computer-implemented process 1300 for outputting voice information in accordance with one embodiment of the present invention. As shown in FIG. 13, step 1310 involves accessing an information selection input. The input may be from a user via a user interface (e.g., by clicking a button, marking a checkbox, entering a word or phrase, etc.). Alternatively, the input may be automatic from a component, device or computer system.

After accessing an information selection input, a determination may be made in step 1320 as to which portion of the voice information the selection input pertains. For example, if an input designates a number of voice minutes used and race, voice information relating to the number of voice minutes used by one or more races across various carriers may be identified for subsequent output. As a second example, an input designating BRPS and phone manufacturer may correspond to voice information relating to revenue from wireless subscribers using wireless devices from certain manufacturers across various carriers.

Step 1330 involves performing pre-output processing on the portion of voice information to be output. Processing in step 1330 may comprise organizing, sorting, filtering, etc. the information before output. The information may be formatted for a given output (e.g., placed in an accessible spreadsheet format, application format for providing access to the information via a software tool, an online format for providing access to the information via an online tool, etc. And in another embodiment, step 1330 may comprise encoding, encrypting, etc. the information before output.

As shown in FIG. 13, step 1340 involves outputting the determined portion of the voice information as voice market analysis. The voice information may be output via a datafeed, presentation and/or accessed using a user interface program (e.g., online user interface, user interface installed on a client computer system, etc.) as discussed above with respect to FIGS. 6 and 8. As such, tailored voice information (e.g., determined by the information selection input of step 1310) may be output to enable convenient and clear market analysis pertaining to various wireless voice market segments across multiple wireless carriers.

Wireless Data Information Used For Market. Analysis

Figure 14:
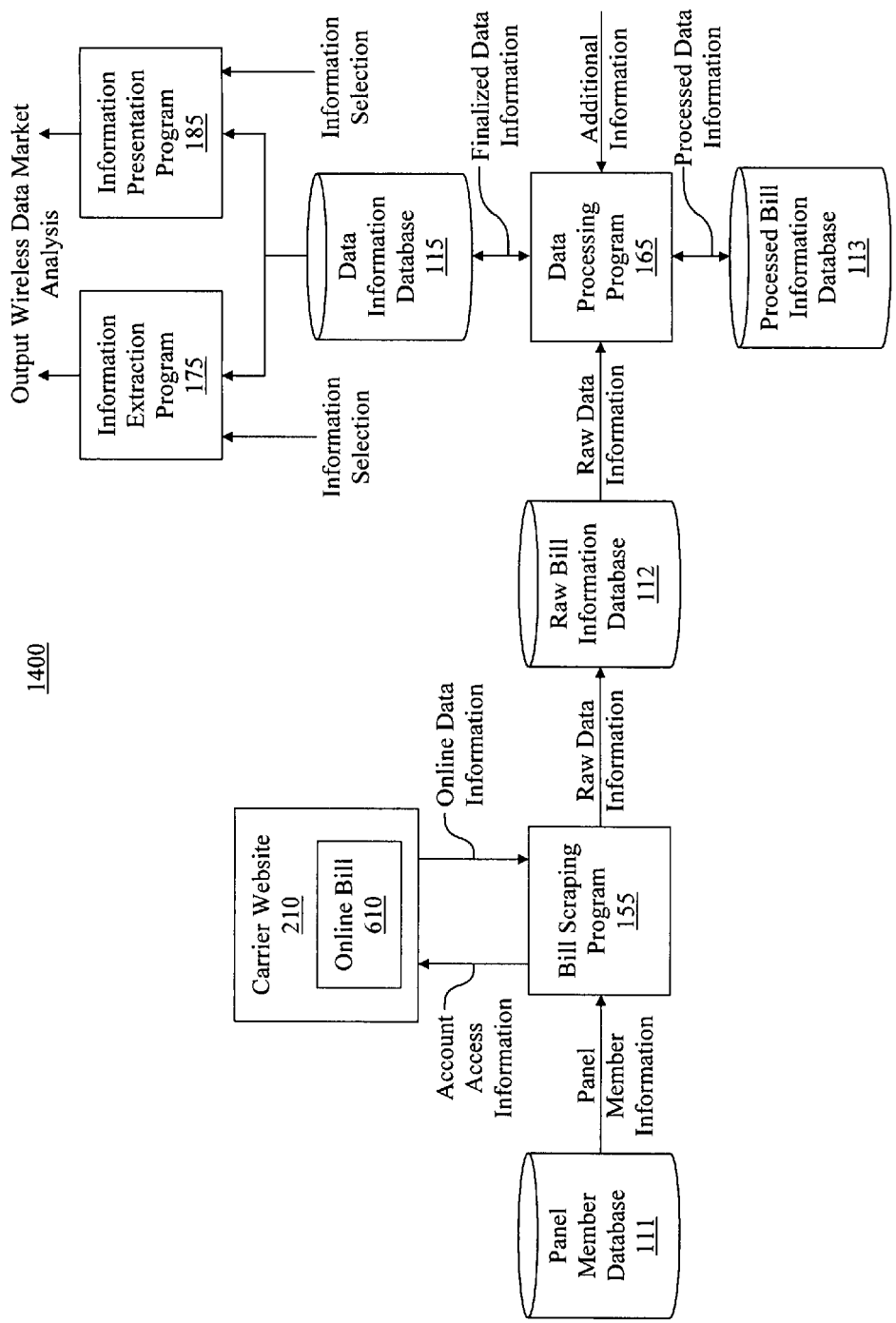
FIG. 14 shows an exemplary system for providing market analysis for a wireless data market in accordance with one embodiment of the present invention.

FIG. 14 shows exemplary system 1400 for providing market analysis for a wireless data market in accordance with one embodiment of the present invention. As shown in FIG. 14, system 1400 operates similarly to system 600 of FIG. 6, except for the access, processing and output of data information (e.g., a ringtone for a wireless device, a ringback for a wireless device, a realtone for a wireless device, a game for the wireless device, audio and/or visual content for playback on the wireless device, at least one of a product and a service applied for using the wireless device, a wallpaper or screensaver for display on a wireless device, etc.) by system 1400 instead of voice information by system 600 as discussed above with respect to FIG. 6. Additionally, data processing program 165 performs additional processing steps (e.g., data information classification as discussed in FIGS. 19 and 20 below) when processing data information instead of voice information.

Figure 15:
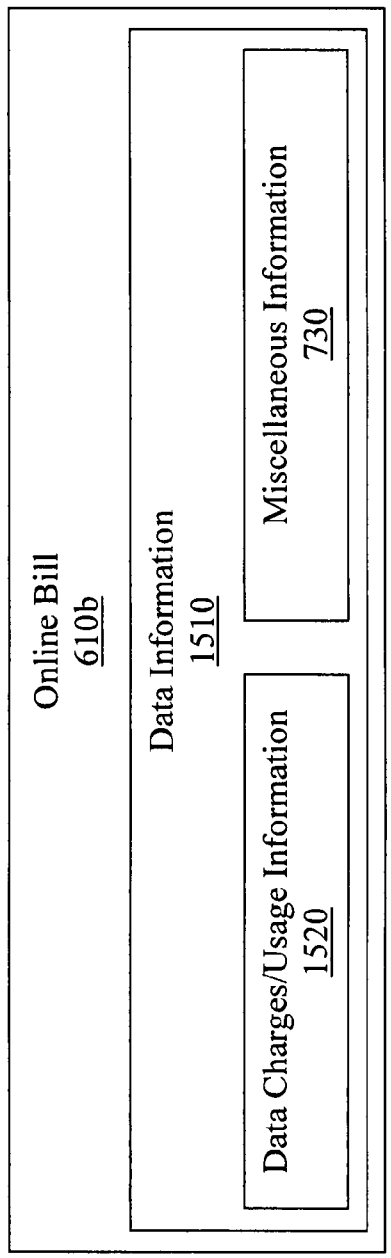
FIG. 15 shows an exemplary online bill with wireless data information in accordance with one embodiment of the present invention.

FIG. 15 shows exemplary online bill 610b with wireless data information in accordance with one embodiment of the present invention. Bill 610b comprises data information 1510, where data information 1510 may comprise data charges/usage information 1520 and miscellaneous information 730.

Data charges/usage information 1520 may comprise information regarding data charges and/or data usage. For example, data charges may comprise overage charges, package charges, transactional charges, internet/WAP charges, Wi-Fi/Broadband charges, messaging (e.g., SMS, MMS, etc.) charges, download charges, etc. Data usage may comprise number of downloads/purchases, time of download/ purchase, date of download/purchase, type of data usage (e.g., access content, play content, online game play, send message, etc.), time of data usage, duration of data usage, etc. As such, information 1520 may be used to provide wireless data market analysis as discussed herein. And similar to that discussed above with respect to FIG. 7, miscellaneous information 730 may be used to provide further and/or more detailed wireless data market analysis.

Figure 16:
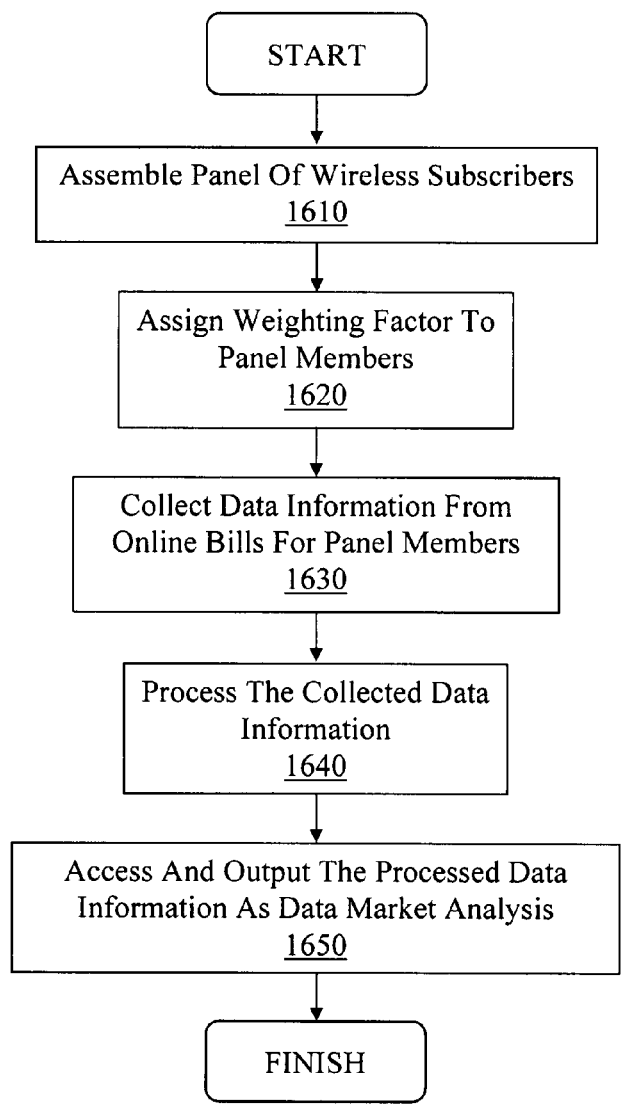
FIG. 16 shows an exemplary computer-implemented process for providing market analysis for a wireless data market in accordance with one embodiment of the present invention.

FIG. 16 shows exemplary computer-implemented process 1600 for providing market analysis for a wireless data market in accordance with one embodiment of the present invention. As shown in FIG. 16, step 1610 involves determining a panel of wireless subscribers (e.g., as discussed above with respect to FIGS. 2, 3A and 3B). A weighting factor (e.g., a composite weighting factor) may be assigned to panel members (e.g., as described above with respect to FIGS. 5A and 5B) in step 1620.

Step 1630 involves collecting data information from online bills of the panel members (e.g., in accordance with process 900 of FIG. 9). The information may be scraped (e.g., by program 155) from the online bills (e.g., 610) after accessing a carrier website (e.g., 210).

Figure 18:
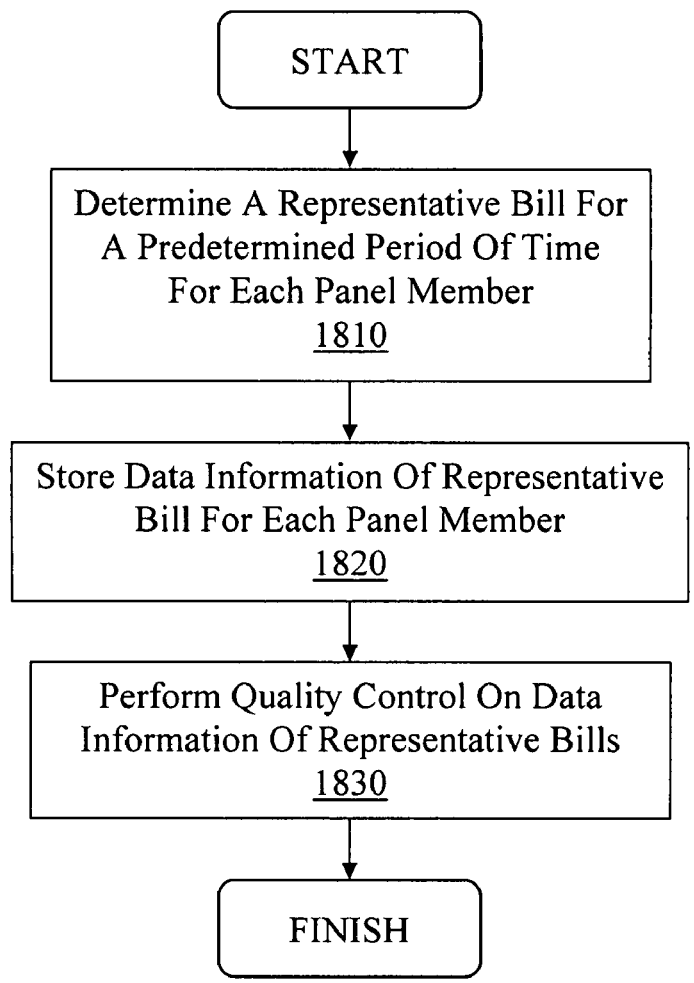
FIG. 18 shows an exemplary computer-implemented process for performing initial processing of data information in accordance with one embodiment of the present invention.
Figure 19:
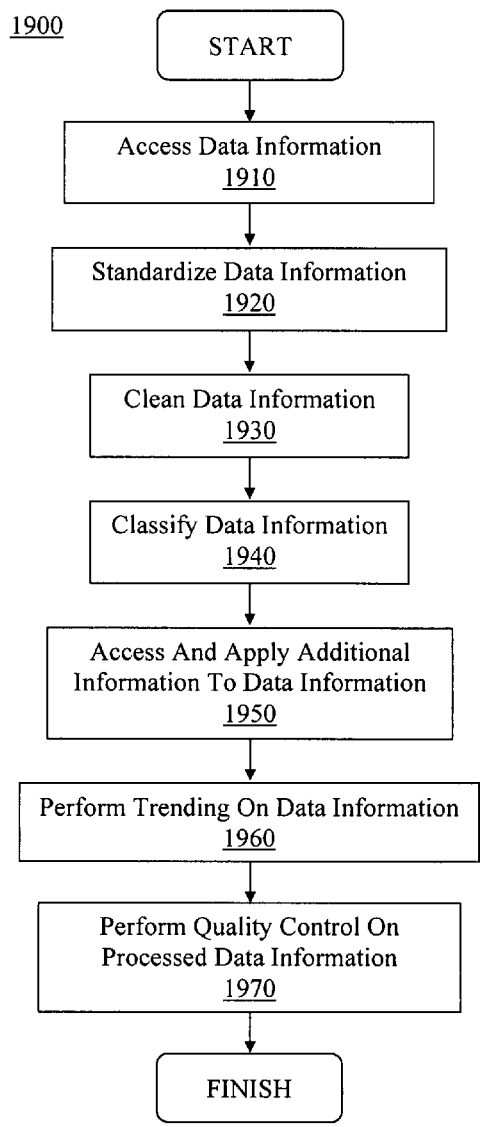
FIG. 19 shows an exemplary computer-implemented process for processing data information in accordance with one embodiment of the present invention.

As shown in FIG. 16, step 1640 involves processing the collected data information (e.g., in accordance with process 1800 of FIG. 18 and/or process 1900 of FIG. 19). Processing may be performed (e.g., by program 165) to determine a representative bill. Additionally, the processing may comprise quality control, trending, standardization, cleaning, and/or applying additional information to the data information to further and/or more detailed data market analysis.

Figure 21:
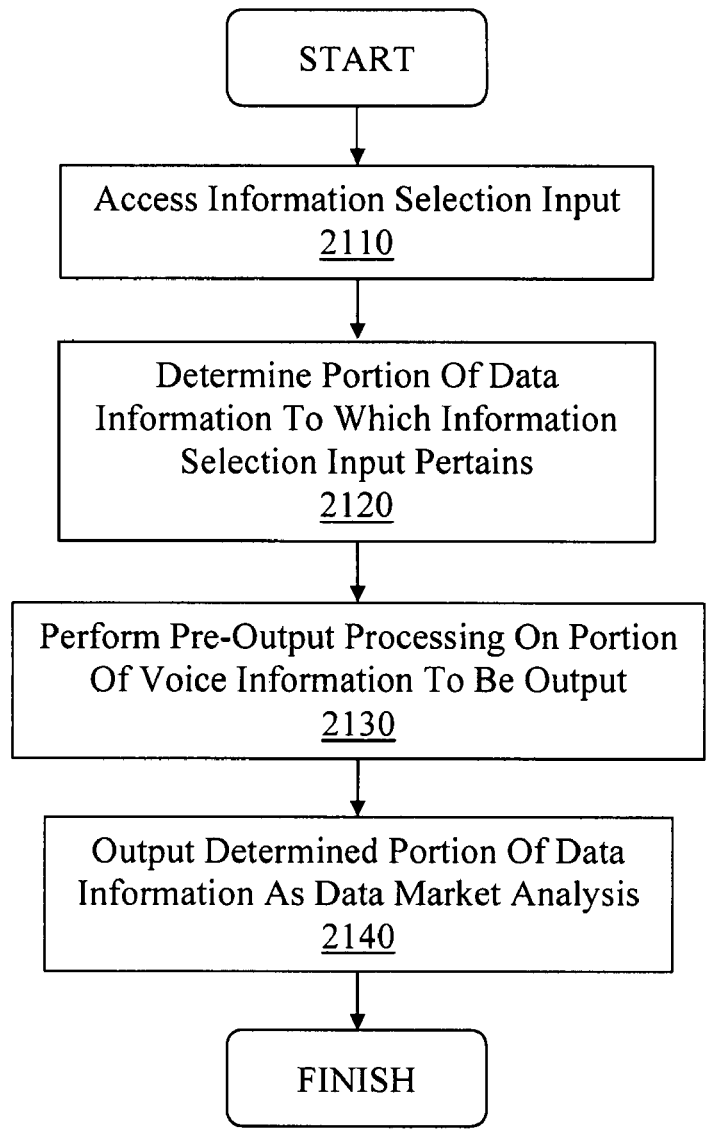
FIG. 21 shows an exemplary computer-implemented process for outputting data information in accordance with one embodiment of the present invention.

As shown in FIG. 16, step 1650 involves accessing and outputting the processed data information as data market analysis (e.g., in accordance with process 2100 of FIG. 21). The information may be output by numerous delivery mechanisms. For example, a datafeed may be established (e.g., using program 175) to transmit (e.g., stream, etc.) the information to another device, component, system, etc. In another embodiment, the data information may be presented (e.g., using spreadsheets, charts, tables, etc.) and/or accessed using a user interface program (e.g., online user interface, user interface installed on a client computer system, etc.).

Figure 17:
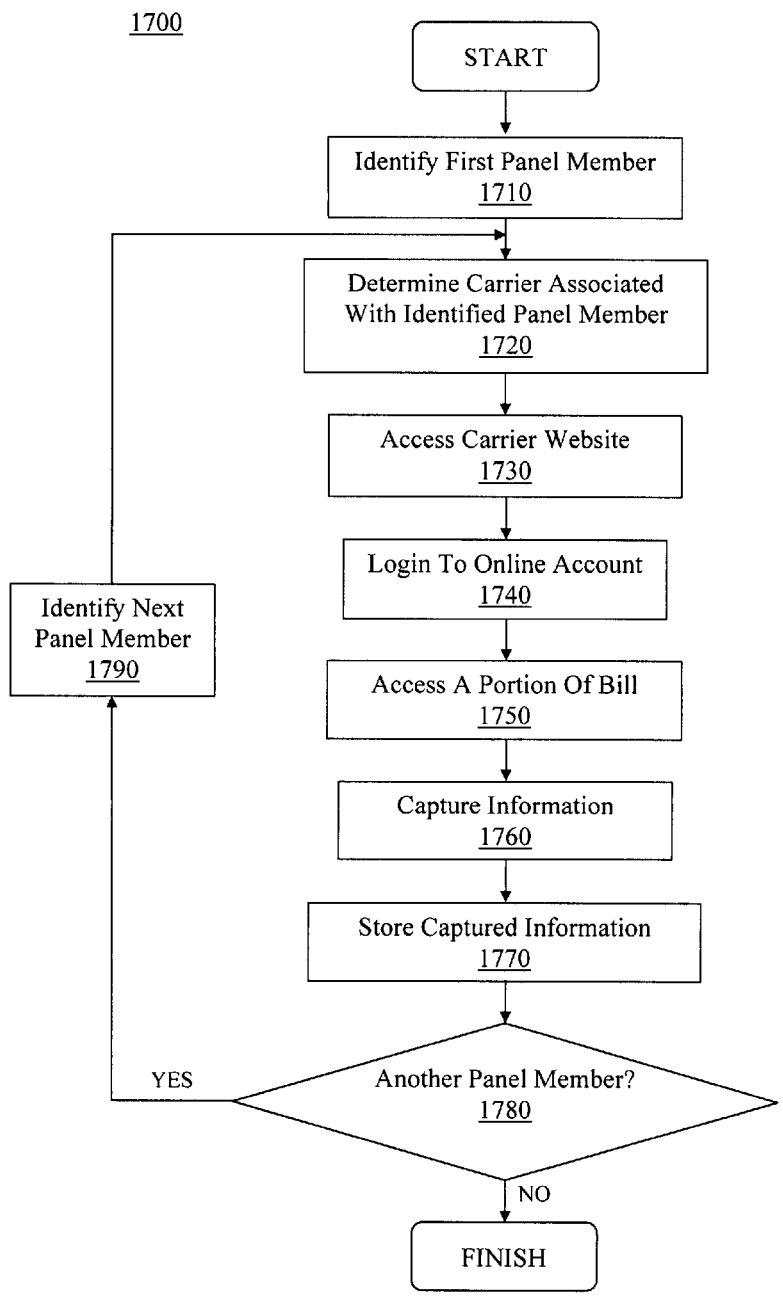
FIG. 17 shows an exemplary computer-implemented process for collecting data information from online bills in accordance with one embodiment of the present invention.

FIG. 17 shows exemplary computer-implemented process 1700 for collecting data information from online bills in accordance with one embodiment of the present invention. As shown in FIG. 17, step 1710 involves identifying a first panel member. A carrier associated with the identified panel member is determined in step 1720, and may be performed in accordance with process 1000 of FIG. 10.

Step 1730 involves accessing a website (e.g., 210) of the determined carrier. The online account may then be logged into in step 1740 (e.g., using account access information provided by the panel member). A portion of the bill may then be accessed in step 1750, which may involve locating a correct screen on the website to display the online bill, clicking on appropriate portions/links in the website to display relevant portions (e.g., those displaying data information, miscellaneous information, etc.) of the bill, or the like.

After relevant portions of the online bill have been accessed, the accessed information may be captured in step 1760 and stored in step 1770. It should be appreciated that the information may be captured and stored using copy and paste operations, screen capture and OCR operations, or the like.

After the information has been captured and stored for the identified member, a determination may be made in step 1780 as to whether another panel member exists. If it is determined that another panel member exists, then a next panel member may be identified in step 1790. If another panel member does not exist, then process 1700 may terminate.

FIG. 18 shows exemplary computer-implemented process 1800 for performing initial processing of data information in accordance with one embodiment of the present invention. As shown in FIG. 18, step 1800 involves determining a representative bill for a predetermined period of time for each panel member. Given the inherent efficiency of the bill scraping process described herein (e.g., with respect to FIG. 17), duplicative or otherwise superfluous information may be compiled due to frequent (e.g., every day, etc.) bill scraping. As such, a representative bill may be compiled to represent a given time period (e.g., a representative monthly bill, etc.). The representative bill may comprise a single bill with representative values for a predetermined period of time (e.g., monthly intervals, etc.) for each panel member. Alternatively, the representative bill may comprise averaged values from multiple bills for a predetermined period of time for each panel member. After compiling representative bills, the processed data information from the representative bills may be stored (e.g., in database 113) for each panel member in step 1820.

Step 1830 involves performing quality control on data information of representative bills. The quality control may comprise comparing total/summary fields with a sum of fields contributing to the total. If the sum does not match the total, then the data is erroneous and may be reacquired and/or processed. Additionally, it should be appreciated that other quality control processes may be carried out on the information to verify its accuracy, completeness, etc.

FIG. 19 shows exemplary computer-implemented process 1900 for processing data information in accordance with one embodiment of the present invention. As shown in FIG. 19, step 1910 involves accessing data information. The data information may be that scraped from an online bill of a panel member. Additionally, the data information may be accessed by a program (e.g., 165) from a database (e.g., 112) storing the data information.

Step 1920 involves standardizing the data information. For example, a common name may be chosen for similar fields of different carriers. As such, a more accurate and meaningful comparison can be made of data information from one carrier to that of another carrier.

As shown in FIG. 19, step 1930 involves cleaning the data information. For example, unnecessary characters may be removed, misspelled words may be corrected, incomplete names/titles may be corrected by comparing to a list of known names/titles, etc. As such, the data information may be more easily accessed, processed, etc. Moreover, clean information increases the accuracy of resulting market analysis by promoting more accurate comparisons, groupings, and the like.

Step 1940 involves classifying the data information. For example, data used, purchased, or otherwise downloaded may be grouped in many ways. In one embodiment, the data information may be classified first by data type (e.g., ringtone, ringback, realtone, application, game, audio and/or visual content, product, service, wallpaper, screensaver, etc.), then further classified based upon one or more characteristics and/or attributes of the data information within each data type. For example, ringtone and audio downloads for playback on a wireless device may be grouped by genre, by artist, etc. Additionally, downloaded games may be organized by genre, by producer, etc. Further, it should be appreciated that the data information may be classified more than one time to provide different organizations of the information.

Step 1950 involves accessing and applying additional information to the data information. The additional information can be supplied by a third party (e.g., census information), the panel member (e.g., user-supplied information), or other sources. When applied to the existing data information, the additional information enables further grouping and organizing to enable further and/or more detailed data market analysis. For example, applying age data (e.g., from surveys, average age information from the census, etc.) to the data information enables the panel members to be grouped into age ranges. As such, market analysis may then show, for example, that one carrier not only enjoys more revenue for game downloads from all its subscribers, but receives more revenue than any other carrier for game downloads by those under the age of 18.

As shown in FIG. 19, step 1960 involves performing trending on data information. Data information may be accessed over time, such that changes over time may be provided as part of the data market analysis. For example, data information from the different time periods may be accessed and compared, thereby enabling the storage of information (e.g., in database 113, database 115, etc.) relating to changes in the data information over time. The trending information may be subsequently accessed similar to other data information discussed thus far for providing wireless data market analysis.

Step 1970 involves performing quality control on the processed data information. Quality control processes may be applied as discussed above with respect to step 1830 of FIG. 18.

Figure 20:
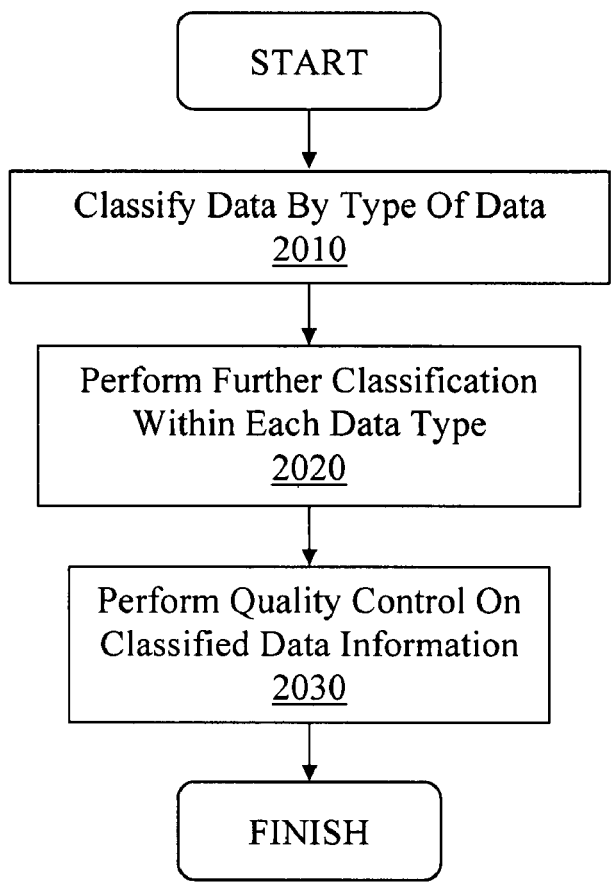
FIG. 20 shows an exemplary computer-implemented process for classifying data information in accordance with one embodiment of the present invention.

FIG. 20 shows exemplary computer-implemented process 2000 for classifying data information in accordance with one embodiment of the present invention. As shown in FIG. 20, step 2010 involves classifying data by its type. Exemplary data types may comprise ringtones, ringbacks, realtones, applications, games, audio and/or visual content, products, services, wallpapers, screensavers, etc. And in other embodiments, a data type may be defined by one or more characteristics, attributes, etc. of the data items being classified. The classifications of step 2010 may result from user inputs, occur automatically based upon predetermined classification rules/processes, etc.

Step 2020 involves performing further classification within each data type. In one embodiment, the further classification may be based upon one or more characteristics and/or attributes of the data information within each data type. For example, ringtone and audio downloads for playback on a wireless device may be grouped by genre, by artist, etc. Additionally, downloaded games may be organized by genre, by producer, etc. The classifications of step 2020 may result from user inputs, occur automatically based upon predetermined classification rules/processes, etc.

Characteristics used to classify the data items may be obtained from the online bills (e.g., 610b) or from additional information (e.g., provided by a subscriber in response to a survey, obtained from publicly-available information, obtained from private third-party information, etc.). For example, an online bill may provide the name of the artist associated with a ringtone, thereby enabling the ringtone to be classified in a genre determined by the artist. In another embodiment, the characteristic (e.g., an artist associated with the ringtone) used to classify the ringtone may be obtained from additional information (e.g., linking a title of the ringtone provided by the online bill to the artist's name). And in another embodiment, the data items may be classified by a price paid for the items (e.g., paid by a subscriber before access, download, etc.). For example, an audio file with a price of less than one dollar may be classified as a ringtone (e.g., as opposed to a ringback, realtone, etc.).

It should be appreciated that the data information may be classified multiple times to provide different organizations of the information. Additionally, it should be appreciated that the number and/or type of classifications performed may be determined from user inputs, automatic inputs based upon a classification rule/process, etc.

As shown in FIG. 20, step 2030 involves performing quality control on the classified data information. For example, if a given download is placed into an excessive number of categories, then the data information may become unintentionally weighted and less accurate. As such, if the number of groupings into which a download is placed exceeds a defined limit, then the classification (e.g., steps 2010 and/or 2020) may be repeated. And as a further example, the accuracy of the classification (e.g., genre of an audio download) may be verified by indexing the classified data using a different characteristic of the data (e.g., using song title to determine genre) than that used for the original classification (e.g., using an artist's name to determine genre) and comparing the two results. And in another embodiment, where classification of data information results in an "unknown" grouping comprising data items with at least one unrecognized attribute (e.g., the publisher of a game, the name of an artist, etc.), additional attempts to classify these data items may be made. For example, if an "unknown" grouping resulted from classification of ringtones based upon genre using an artist's name, then additional attempts to place these ringtones in appropriate genre groupings may be made using a different attribute (e.g., song title, etc.) of each ringtone. Further, it should be appreciated that other quality control processes may be carried out on the information to verify that it is representative, accurate, complete, etc.

FIG. 21 shows exemplary computer-implemented process 2100 for outputting data information in accordance with one embodiment of the present invention. As shown in FIG. 21, step 2110 involves accessing an information selection input. The input may be from a user via a user interface (e.g., by clicking a button, marking a checkbox, entering a word or phrase, etc.). Alternatively, the input may be automatic from a component, device or computer system.

After accessing an information selection input, a determination may be made in step 2120 as to which portion of the data information the selection input pertains. For example, if an input designates a number of game downloads and race, data information relating to the number of game downloads by one or more races across various carriers may be identified for subsequent output. As a second example, an input designating BRPS and phone manufacturer may correspond to data information relating to revenue from wireless subscribers using wireless devices from certain manufacturers across various carriers.

Step 2130 involves performing pre-output processing on the portion of data information to be output. Processing in step 2130 may comprise organizing, sorting, filtering, etc. the information before output. The information may be formatted for a given output (e.g., placed in an accessible spreadsheet format, application format for providing access to the information via a software tool, an online format for providing access to the information via an online tool, etc. And in another embodiment, step 2130 may comprise encoding, encrypting, etc. the information before output.

As shown in FIG. 21, step 2140 involves outputting the determined portion of the data information as data market analysis. The data information may be output via a datafeed, presentation and/or accessed using a user interface program (e.g., online user interface, user interface installed on a client computer system, etc.) as discussed above with respect to FIGS. 14 and 16. As such, tailored data information (e.g., determined by the information selection input of step 2110) may be output to enable convenient and clear market analysis pertaining to various wireless data market segments across multiple wireless carriers.

Computer System Platform

Figure 22:
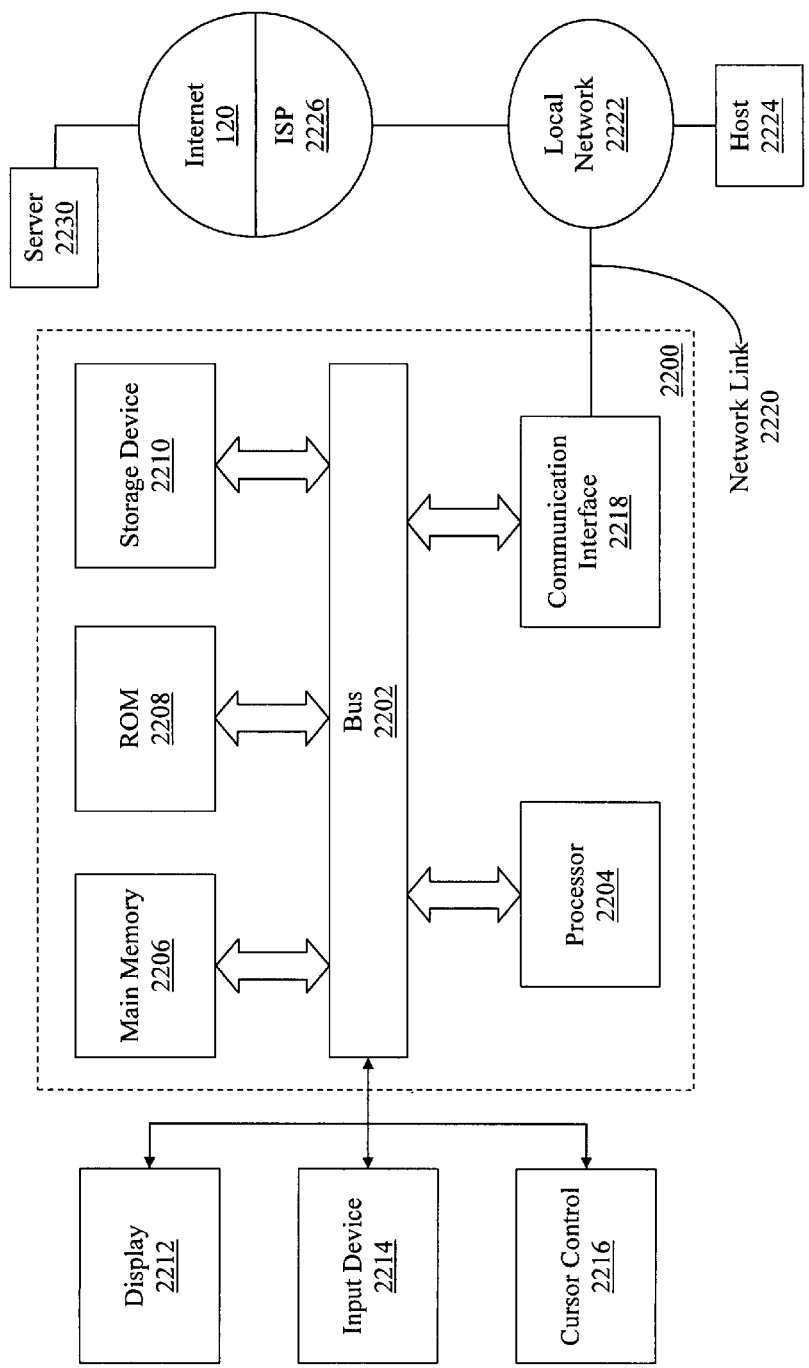
FIG. 22 shows an exemplary computer system upon which embodiments of the present invention may be implemented.

FIG. 22 shows exemplary computer system 2200 upon which embodiments of the present invention may be implemented. With reference to FIG. 22, portions of the present invention are comprised of computer-readable and computer-executable instructions that reside, for example, in computer system 2200 which may be used as a part of a general purpose computer network (not shown). It is appreciated that computer system 2200 of FIG. 22 is merely exemplary. As such, the present invention can operate within a number of different computer systems including general-purpose computer systems, embedded computer systems, laptop computer systems, hand-held computer systems, and stand-alone computer systems.

In the present embodiment, computer system 2200 includes an address/data bus 2202 for conveying digital information between the various components, a central processor unit (CPU) 2204 coupled to bus 2202 for processing the digital information and instructions, a volatile main memory 2206 coupled to bus 2202 comprised of volatile random access memory (RAM) for storing the digital information and instructions, and a non-volatile read only memory (ROM) 2208 coupled to bus 2202 for storing information and instructions of a more permanent nature. In addition, computer system 2200 may also include a data storage device 2210 (e.g., a magnetic, optical, floppy, tape, or other drive) coupled to bus 2202 for storing larger amounts of data. It should be noted that the software program for performing the method of obtaining market data of the present invention may be stored in main memory 2206, ROM 2208, storage device 2210, registers within CPU 2204 (not shown), and/or in an external storage device (not shown).

As shown in FIG. 22, computer system 2200 may be coupled via bus 2202 to an optional display device 2212 (e.g., a CRT monitor, LCD monitor, etc.) for displaying information received from computer system 2200. An optional input device 2214 (e.g., an alphanumeric keyboard) may also be coupled to computer system 2200 via bus 2202 for communicating information and command selections to CPU 2204. Cursor control device 2216 (e.g., a mouse, trackball, light pen, etc.) may also be coupled to computer system 2200 via bus 2202 for communicating direction information and command selections to CPU 2204 and for controlling cursor movement (e.g., on display 2212). Additionally, computer system 2200 can include a mechanism for emitting an audible signal (not shown).

Computer system 2200 may also include a communication interface 2218 coupled to bus 2202. Communication interface 2218 provides a two-way data communication coupling to local network 2222 via network link 2220. For example, communication interface 2218 may be an integrated services digital network (ISDN) device or modem to provide a data communication connection to a corresponding type of telephone line. As another example, communication interface 2218 may be a local area network (LAN) device to provide a data communication connection to a compatible LAN. And as yet another example, network link 2220 may comprise a wireless connection between communication interface 2218 and local network 2222. Regardless of the implementation utilized, communication interface 2218 may send and receive electrical, electromagnetic, and/or optical signals that carry digital data streams representing various types of information.

As shown in FIG. 22, network link 2220 may provide data communication through one or more networks to other data devices. For example, network link 2220 may provide a connection through local network 2222 to a host computer 2224 or to data equipment operated by internet service provider (ISP) 2226. ISP 2226 in turn provides data communication services through the worldwide packet data communication network, now commonly referred to as the "Internet" 120. Local network 2222 and Internet 120 may use electrical, electromagnetic, and/or optical signals to convey digital data streams. The signals through the various networks and network link 2220, which carry digital data to and from computer system 2200, are exemplary forms of carrier waves transporting information.

Accordingly, computer system 2200 can send and receive messages through networks(s), network link 2220, and communication interface 2218. For example, server 2230 may transmit a requested code for an application program through Internet 120, ISP 2226, local network 2222, and communication interface 2218. The received code may be executed by CPU 2204 upon receipt, and/or be stored in one of the coupled memory devices (e.g., storage device 2210, ROM 2208, RAM 2206, etc.) for later execution.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A computer-implemented method of accessing, collecting and classifying that uses information of wireless voice market subscribers, said method comprising:
   receiving, with a survey participant computer system, subscriber access information from a wireless subscriber to access a wireless carrier webpage, the access information including an indication of a first candidate carrier;
   accessing, with the survey participant computer system, a webpage of the first candidate carrier and using the access information to access an online bill of the wireless subscriber via the webpage;
   when the access of the online bill via the webpage of the first candidate carrier is unsuccessful, accessing the online bill via a webpage of a subsequent candidate carrier from a list of candidate carriers generated by an online survey system, the survey participant computer system to access each of the candidate carrier webpages until access to the online bill of the wireless subscriber is successful via the subsequent candidate carrier webpage using the subscriber access information;
   collecting voice information from the accessed online bill associated with the subsequent candidate carrier webpage, and saving the voice information to a memory associated with the survey participant computer system;
   processing said voice information to generate processed voice information associated with the wireless subscriber; and
   classifying said processed voice information to generate market analysis information for said wireless voice market.

2. The computer-implemented method of claim 1, wherein said voice information from the accessed online bill comprises at least one of charge information and usage information for wireless calls associated with the wireless subscriber that is a panelist member.

3. The computer-implemented method of claim 1, wherein said wireless subscriber is identified using responses from an online survey, said responses indicating subscribers who fit a profile.

4. The computer-implemented method of claim 1, wherein said processing said voice information comprises at least one of standardizing said voice information, cleaning said voice information, or applying additional information to said voice information to provide further market analysis for said wireless voice market.

5. The computer-implemented method of claim 1 further comprising:
   grouping a plurality of wireless subscribers into a plurality of groupings based upon a characteristic shared by members of each of said plurality of groupings;
   performing a comparison of a number of members within a select grouping with respect to a predetermined number of people having said characteristic within a predetermined geographical area; and
   assigning a weighting factor to members of said select grouping based upon said comparison, wherein an application of said weighting factor to said select grouping provides a panel that is more representative of a population within said predetermined geographical area.

6. The computer-implemented method of claim 1 further comprising:
   in response to an input identifying said wireless voice market, outputting said market analysis information using at least one of a presentation, a datafeed, or an online access tool enabling a third party to retrieve select portions of said voice information.

7. The computer-implemented method of claim 1 further comprising:
   accessing archived market analysis information for said wireless voice market; and
   processing said archived market analysis information along with said voice information to provide further voice information that indicates a change in said generated market analysis information over time.

8. A computer system to access, collect and process that uses information of wireless voice market subscribers comprising a processor coupled to a bus and a memory coupled to said bus, wherein said memory comprises instructions to, when executed on said processor, at least:
   receive subscriber access information from a wireless subscriber to access a wireless carrier webpage, the access information including an indication of a first candidate carrier;
   access a webpage of the first candidate carrier and use the access information to access an online bill of the wireless subscriber via the webpage;
   when the access of the online bill via the webpage of the first candidate carrier is unsuccessful, accessing the online bill via a webpage of a subsequent candidate carrier from a list of candidate carriers, and to access each of the candidate carrier webpages until access to the online bill of the wireless subscriber is successful via the subsequent candidate carrier webpage using the subscriber access information;

collect wireless voice information from the accessed online bill associated with the subsequent candidate carrier webpage, and saving the voice information to the memory; and process said wireless voice information to provide market analysis information for said wireless voice market.

9. The system of claim 8, wherein said wireless voice information from the accessed online bill comprises at least one of charge information and usage information for wireless calls associated with the wireless subscriber.

10. The system of claim 8 further comprising a plurality of wireless subscribers assembled using responses from an online survey, said responses indicating subscribers who fit a profile.

11. The system of claim 8, wherein said processing said wireless voice information comprises at least one of standardizing said wireless voice information, cleaning said wireless voice information, classifying said wireless voice information, or applying additional information to said wireless voice information to provide further market analysis information for said wireless voice market.

12. The system of claim 8, further comprising:
to group members of a plurality of wireless subscribers into a plurality of groupings based upon a characteristic shared by members of each of said plurality of groupings;

to perform a comparison of a number of members within a select grouping with respect to a predetermined number of people having said characteristic within a predetermined geographical area; and to assign a weighting factor to members of said select grouping based upon said comparison, wherein an application of said weighting factor to said select grouping provides a panel that is more representative of a population within said predetermined geographical area.

13. The system of claim 8, further comprising:
in response to an input identifying said wireless voice market, to output said market analysis information using at least one of a presentation, a datafeed, or an online access tool enabling a third party to retrieve select portions of said wireless voice information.

14. The system of claim 8, further comprising:
to access archived market analysis information for said wireless voice market; and to process said archived market analysis information along with said wireless voice information to provide further wireless voice information that indicates a change in said provided market analysis over time.

* * * * *

UNITED STATES PATENT AND TRADEMARK OFFICE
CERTIFICATE OF CORRECTION

PATENT NO. : 7,991,661 B1
APPLICATION NO. : 11/732758
DATED : August 2, 2011
INVENTOR(S) : Gaffney et al.

Page 1 of 1

It is certified that error appears in the above-identified patent and that said Letters Patent is hereby corrected as shown below:

Title page, Item (75) inventors: Please add "Brian T. Monighetti"

Signed and Sealed this
Twenty-first Day of August, 2012

David J. Kappos
*Director of the United States Patent and Trademark Office*